(12) United States Patent
Konno et al.

(10) Patent No.: US 6,873,377 B2
(45) Date of Patent: Mar. 29, 2005

(54) LIQUID CRYSTAL DISPLAY DEVICE

(75) Inventors: Takayuki Konno, Tokyo (JP); Osamu Sukegawa, Tokyo (JP); Masayoshi Suzuki, Tokyo (JP); Makoto Watanabe, Tokyo (JP)

(73) Assignees: NEC Corporation, Tokyo (JP); NEC LCD Technologies, Ltd., Kanagawa (JP)

( * ) Notice: Subject to any disclaimer, the term of this patent is extended or adjusted under 35 U.S.C. 154(b) by 112 days.

(21) Appl. No.: 10/238,279

(22) Filed: Sep. 10, 2002

(65) Prior Publication Data

US 2003/0048402 A1 Mar. 13, 2003

(30) Foreign Application Priority Data

Sep. 11, 2001 (JP) ........................................ 2001-275706

(51) Int. Cl.[7] .......................................... G02F 1/1343
(52) U.S. Cl. .......................................... 349/33; 349/139
(58) Field of Search .............................. 349/139, 33, 34

(56) References Cited

U.S. PATENT DOCUMENTS

| | | | | |
|---|---|---|---|---|
| 6,437,844 B1 | * | 8/2002 | Hattori et al. | 349/129 |
| 6,456,266 B1 | * | 9/2002 | Iba et al. | 345/87 |
| 6,476,898 B2 | * | 11/2002 | Song et al. | 349/139 |
| 6,504,592 B1 | * | 1/2003 | Takatori et al. | 349/129 |
| 6,515,725 B1 | * | 2/2003 | Hattori et al. | 349/123 |
| 6,535,259 B2 | * | 3/2003 | Lee et al. | 349/123 |
| 6,542,211 B1 | * | 4/2003 | Okada et al. | 349/130 |
| 6,597,424 B2 | * | 7/2003 | Hattori et al. | 349/146 |

FOREIGN PATENT DOCUMENTS

| | | |
|---|---|---|
| JP | 55-142316 | 11/1980 |
| JP | 7-84254 | 3/1995 |
| JP | 8-327822 | 12/1996 |
| JP | 9-218411 | 8/1997 |
| JP | 10-20284 | 1/1998 |
| JP | 10-142638 | 5/1998 |
| JP | 3074640 | 6/2000 |
| JP | 2000-321588 | 11/2000 |
| JP | 2000-330141 | 11/2000 |

OTHER PUBLICATIONS

Y. Yamaguchi et al, "Late–News Paper: Wide–Viewing–Angle Display Mode for the Active–Matrix LCD Using Bend–Alignment Liquid–Crystal Cell", *SID 93 DIGEST*, pp. 277230, 1993.

* cited by examiner

*Primary Examiner*—Kenneth Parker
(74) *Attorney, Agent, or Firm*—Choate, Hall & Stewart

(57) ABSTRACT

A dedicated control signal electrode is provided between pixel electrodes, and a strong electric field is generated between the control signal electrode and the common electrode to quickly and securely make an initial transition from liquid crystal molecules in a splay alignment state to the same in a bend alignment state. In addition, generating a strong electric field between the control signal electrode and the common electrode even during operation for displaying an image makes liquid crystal molecules stably stay in a bend alignment state. In this case the scan signal electrode, the video signal electrode and the common electrode, which are required for displaying an image, are not used to make a transition from liquid crystal molecules in a splay alignment state to the same in a bend alignment state and make the same stay in a bend alignment state.

14 Claims, 12 Drawing Sheets

LIQUID CRYSTAL DISPLAY DEVICE

BACKGROUND OF THE INVENTION

1. Field of the Invention

The present invention relates to an electrode structure for controlling an alignment of liquid crystal molecules in an OCB (which is an abbreviation for optically compensated birefringence and hereinafter abbreviated to "OCB") mode liquid crystal display device.

2. Description of the Related Art

A TN (twisted nematic) mode which is widely used at present in a liquid crystal display device has a high contrast, but has a problem in that visual dependence is remarkable. Thus, in order to solve such a problem, various characteristic improving methods have been proposed, centering on a pixel dividing method in which pixels are divided into regions and liquid crystal molecules are controlled in each of the divided regions. However, a liquid crystal display device using a nematic liquid crystal generally has a low response speed. That is, a response time required for changing gray scale display reaches about 100 ms in maximum. Thus, it cannot be adapted to the display of a moving image for which a high response speed is required. Therefore, a display mode enabling a wide viewing angle and a high speed response, and suitably used in a moving image LCD (liquid crystal display), has been required.

The OCB mode LCD is described as an LCD having a high speed response in addition to a wide viewing angle (see Y. Yamaguchi, et al., SID'93, Digest, pp. 277–280 or JP 07-084254 A). A liquid crystal cell used in the OCB mode is made to stay in a bend alignment state, and is also called a n cell. JP 55-142316 also indicates that the n cell indicates a high speed response.

FIG. 1 shows an example of a fundamental configuration of the OCB mode. A liquid crystal layer 915 in a bend alignment state, sandwiched between two glass substrates 901 and 921, which are disposed to overlap each other so that rubbing directions thereof are parallel to each other, is sandwiched by negative birefringence compensation plates 956 and 966. The negative birefringence compensation plates 956 and 966 are made of discotic liquid crystal; are optically negative; and each have a structure in which a tilt of the principal axis in a layer changes. Furthermore, the negative birefringence compensation plates 956 and 966 are sandwiched by two polarizers 916 and 936. In such a structure of a liquid crystal display device, the bend alignment of the liquid crystal layer 915 always exhibits a self-compensation capability in a rubbing direction and an optically symmetric characteristic owing to its structure.

A transition from liquid crystal molecules in a bend alignment state to the same in another alignment state becomes maximum in a plane which is parallel to the direction of an optical axis, that is, an orientation direction of the liquid crystal molecule at interfaces between the liquid crystal layer 915 and the two glass substrates 901 and 921, and perpendicular to the substrates. In addition, in the case where an optical anisotropic medium is sandwiched by two polarizers whose transmission axes are orthogonal to each other, a maximum intensity of transmission light is obtained when the optical axis is made to have an angle of 45 degrees relative to the transmission axis of the polarizer. Therefore, in the case where an liquid crystal cell in a bend alignment state is sandwiched by two polarizers whose transmission axes are orthogonal to each other, change of birefringence in a liquid crystal display device becomes maximum when the optical axis of a liquid crystal molecule in the liquid crystal layer is disposed to have an angle of 45 degrees relative to the transmission axis of the polarizer. In the case where the rubbing direction is fixed to a horizontal direction, a maximum intensity of transmission light in the liquid crystal display device is obtained when the transmission axes of the two polarizers 916 and 936 are disposed to have 45 degrees relative to each other.

A driving method for the OCB-mode liquid crystal display device can be classified into two methods, i. e., a normally black LCD to perform black display at a low voltage and a normally white LCD to perform black display at a high voltage. In the case of the normally black LCD in which birefringence to be compensated for is large, a light leakage due to wavelength dispersion is large resulting in difficulty in obtaining sufficient contrast. Therefore, JP 08-327822 A discloses a technique to solve the above-stated problem by employing two negative birefringence compensation plates shown in FIG. 1 to realize a normally black LCD. In more detail, almost all liquid crystal molecules except for molecules near the interface between a liquid crystal layer and an alignment layer are vertically aligned at a high voltage. When residual birefringences in both interfaces between the liquid crystal layer 915 and the two glass substrates 901, 921 are compensated by the two negative birefringence compensation plates, a wide viewing angle characteristic is obtained.

As described above, the OCB mode having superior characteristics such as a wide viewing angle and a high speed response includes large problems. Liquid crystal molecules of a bend alignment cell used in the OCB mode are aligned in a splay alignment state as an initial alignment state and therefore, when a power source is turned on, the liquid crystal molecules thus aligned in all pixels have to be aligned in a bend mode. In addition, during operation for displaying an image, it is necessary to continuously apply a voltage equal to or larger than a critical voltage Vc, which makes the bend alignment of a liquid crystal cell more stable than the splay alignment thereof, to the liquid crystal cell.

The critical voltage Vc is obtained as follows. That is, change of Gibbs energy versus change of a voltage, which is measured with respect to a liquid crystal cell in a splay alignment state and in a bend alignment state, is calculated based on respective parameters such as a physical property value of a liquid crystal material, a gap between two glass substrates, and a pretilt angle associated with a liquid crystal molecule, and changes of curves associated with both cases of a liquid crystal cell in a splay alignment state and in a bend alignment state are compared with each other. In this case, the alignment exhibiting smaller Gibbs energy is more stable. Gibbs energy versus a voltage applied to the liquid crystal cell is plotted with respect to the splay alignment and the bend alignment of the liquid crystal cell, Gibbs energy being plotted on the ordinate and a voltage being plotted on the abscissa, and then, the applied voltage at the intersection of curves of Gibbs energy, which curves correspond to the splay alignment and the bend alignment, is determined as a critical voltage Vc.

An example of Gibbs energy thus calculated is shown in FIG. 2. Theoretically, when a voltage equal to or larger than the critical voltage Vc is applied to a liquid crystal cell, the bend alignment becomes more stable than the splay alignment. However, in order to quickly change the splay alignment of a liquid crystal cell to the bend alignment thereof, it is necessary to apply a far higher voltage to the liquid crystal cell. When a voltage of about 20 V is applied as a high voltage to a liquid crystal cell, the change is completed within a short time of several seconds or less. However, when a liquid crystal cell is driven by an active matrix element, only about 5 V as a maximum voltage can be applied to the liquid crystal cell in terms of protection of a thin film transistor. Application of voltage of 5 V cannot or rarely can make a transition from a liquid crystal cell in a certain alignment state to the same in a desired alignment state, which phenomenon is verified by the inventor's experiments.

To address such a problem, the following methods are proposed.

According to JP 09-218411 A, the following method is described. That is, a spacer as a gap material capable of horizontally aligning liquid crystal molecules near the surface of the spacer and at the same time, serving as nucleus generating means for making a transition from the molecules in a certain alignment state to the same in a bend alignment state is utilized, enabling liquid crystal molecules to stably stay in a bend alignment state without necessity to change normal steps for manufacturing a liquid crystal display device.

According to JP 10-142638 A, the following method is described. That is, a spacer having a diameter smaller than a gap between two glass substrates and equipped with an ability to align liquid crystal molecules vertically near the surface of the spacer is used, and the liquid crystal molecules just on the spacer are aligned perpendicular to the spacer to obtain liquid crystal molecules in a pseudo-hybrid alignment state, thereby promoting the transition from liquid crystal molecules in a splay alignment state to the same in a bend alignment state.

Also, according to JP 10-020284 A, the following method is described. That is, a convex portion made of a material having a dielectric constant higher than that of a liquid crystal layer or a convex portion made of a conductive material and having a taper is formed on each pixel electrode to partially produce a strong electric field. Or, a region for aligning liquid crystal molecules in a high pretilt angle is provided on each pixel electrode to partially obtain liquid crystal molecules aligned at a high pretilt angle with respect to the surface of a substrate, whereby the region serves as nucleus generating means for making a transition from liquid crystal molecules in a certain alignment state to the same in a bend alignment state.

Also, according to JP 2000-330141 A, the following method is described. That is, a hybrid alignment film consisting of a horizontally aligning component and a vertically aligning component is used to make liquid crystal molecules largely tilted with respect to the surface of a substrate, so that liquid crystal molecules are in a bend alignment state even when no voltage is applied to the liquid crystal molecules. Thereafter, ultraviolet light rays are irradiated to only a display region to make liquid crystal molecules a little bit tilted with respect to the surface of a substrate, so that liquid crystal molecules are in a splay alignment state when no voltage is applied to the liquid crystal molecules. Thus, the hybrid alignment film serves as nucleus generating means for making a transition from liquid crystal molecules in a certain alignment state located outside a pixel region to the molecules in a bend alignment state.

Also, according to JP 3074640 B, the following method is described. That is, a power-on reset signal is supplied from a system such as a personal computer to a scan signal electrode to generate a strong electric field between the scan signal electrode and a common electrode. Simultaneously, a voltage equal to or larger than the critical voltage Vc required for making liquid crystal molecules stay in a bend alignment state is applied between a pixel electrode and the common electrode to make a transition from liquid crystal molecules in a splay alignment state to the same in a bend alignment state in a short time. In addition, during operation for displaying an image, operation similar to the above-mentioned operation is performed at predetermined intervals to make liquid crystal molecules stay in a bend alignment state.

According to JP 2000-321588 A, the following method is described. That is, a high voltage is applied to a common electrode in a situation where a space between pixel electrodes is made narrow, so that a strong electric field is generated not only between the common electrode and the pixel electrode, but also between a scan signal electrode located between the pixel electrodes and the common electrode and further, between a video signal electrode and the common electrode, securely making a transition from liquid crystal molecules in a splay alignment state to the same in a bend alignment state all over a display surface.

However, problems are found in the above methods. The method described in JP 09-218411 A requires a large number of spacers to uniformly be sprayed to make liquid crystal molecules stably stay in a bend alignment state. However, liquid crystal molecules around the spacer as nucleus generating means are aligned in a distorted direction, causing a leakage of light rays in a black display state.

According to the method described in JP 10-142638 A, since liquid crystal molecules near the surface of a spacer as nucleus generating means are aligned vertical to the surface thereof, liquid crystal molecules located on side surfaces of the spacer are aligned parallel to the substrate, thereby further enhancing a leakage of light rays. Furthermore, since it is necessary to spray a spacer as nucleus generating means having a diameter smaller than that of a gap between two substrates in addition to a gap material, it becomes difficult to fix within the gap the spacer having a diameter smaller than that of the gap to stably display an image.

According to the method described in JP 10-020284 A, in addition to a problem found in that liquid crystal molecules around the spacer as nucleus generating means are aligned in a distorted direction, causing a leakage of light rays in a black display state, problems arise in that the number of steps for forming the nucleus generating means increases and controlling the profile of the convex portion made of a conductive material and having a taper is difficult.

According to the method described in JP 2000-330141 A, a problem arises in that uniformly and stably making liquid crystal molecules tilted largely with respect to the surface of a substrate by using the hybrid alignment film is difficult.

The method described in JP 3074640 B is effective as means for making an initial transition from liquid crystal molecules in a certain alignment state to the same in a desired alignment state and in addition, serves to making liquid crystal molecules stably stay in a bend alignment state during operation for displaying an image by performing reset operation at predetermined time intervals even during operation for displaying an image. However, writing data to display an image in a black display state while stopping normal operation for displaying an image substantially causes deterioration in transmittance of light rays incident on a liquid crystal display device.

Although the method described in JP 2000-321588 A is effective as means for making an initial transition from liquid crystal molecules in a certain alignment state to the same in a desired alignment state, since a high voltage is applied to the common electrode, liquid crystal molecules cannot stably stay in a bend alignment state during operation for displaying an image.

SUMMARY OF THE INVENTION

An object of the present invention is to provide a TN liquid crystal display device capable of quickly and securely making an initial transition from liquid crystal molecules in a splay alignment state to the same in a bend alignment state, and in addition, making liquid crystal molecules stably stay in a bend alignment state.

A liquid crystal display device according to the present invention consists of a TFT substrate a counter substrate and a liquid crystal layer therein. In more detail, first, the TFT substrate includes: a plurality of scan signal electrodes and a plurality of video signal electrodes, both electrodes crossing each other to partition a pixel area into a plurality of pixels; a thin film transistor formed in each of the plurality of pixels; a pixel electrode connected to the thin film transistor; and a control signal electrode formed between the plurality of pixels so as to correspond to each of the plurality of pixels. Secondly, the counter substrate includes a common electrode for supplying a reference voltage to the plurality of pixels. Thirdly, the liquid crystal layer is sandwiched between the TFT substrate and the counter substrate and constructed such that liquid crystal molecules of the liquid crystal layer are aligned parallel to each other at interfaces between the liquid crystal molecules and both of the TFT substrate and the counter substrate.

According to the above-described liquid crystal display device, the control signal electrode is constructed in accordance with any one of the following configurations. That is, the control signal electrode is (1) disposed farther from the liquid crystal layer than the video signal electrode and the pixel electrode,
(2) disposed nearer the liquid crystal layer than the video signal electrode and formed farther from the liquid crystal layer than the pixel electrode, and
(3) formed nearer the liquid crystal layer than the pixel electrode and the video signal electrode.

According to the liquid crystal display device having the configuration corresponding to the item (1) or (2), the pixel electrode and the control signal electrode have an overlap region formed by making the pixel electrode and the control signal electrode geometrically and peripherally overlap each other to shield light incident on the overlap region from a side of the TFT substrate opposite the counter substrate.

The above liquid crystal display device further has the following preferred configurations.

First, the liquid crystal molecules at an interface between the TFT substrate and the liquid crystal layer are aligned in a wiring direction of the scan signal electrode or are aligned in a direction inclined at 45 degrees relative to each side of the pixel electrode.

Secondly, in the event no electric field is applied between the pixel electrode and the common electrode, the liquid crystal molecules are in a splay alignment state, and in the event an electric field larger than an electric field needed to make the liquid crystal layer operate at an initial electric field application stage is applied between the pixel electrode and the common electrode to quickly make a transition from liquid crystal molecules in a splay alignment state to the same in a bend alignment state.

Thirdly, during an operative electric field being applied between the pixel electrode and the common electrode to make the liquid crystal layer operate, an electric field larger than the operative electric field for making the liquid crystal layer operate is continuously applied between the control signal electrode and the common electrode to make the liquid crystal molecules stay in a bend alignment state.

According to the liquid crystal display device having the above-mentioned structure, for example, when a power source is initially turned on, a video signal having an amplitude of 5 V is applied to the pixel electrode and at the same time, a control signal having an amplitude of 20 V and a polarity opposite that of the video signal is applied to the control signal electrode to easily generate a nucleus for making a transition from liquid crystal molecules in a certain alignment state to the same in a desired alignment state at the time of initial turn-on of the power source. In addition, since the amplitude of the control signal is increased up to about 20 V, the transition in all pixels can securely be completed. Accordingly, the initial transition from liquid crystal molecules in a splay alignment state to the same in a bend alignment state can securely be completed within more than 10 seconds without applying a high voltage to the pixel electrode. In addition, continuously applying the voltage to the control signal electrode during operation for displaying an image makes the liquid crystal molecules stably stay in a bend alignment state

DETAILED DESCRIPTION OF THE PREFERRED EMBODIMENTS

Embodiments of the present invention will be described in detail below.

Figure 1:
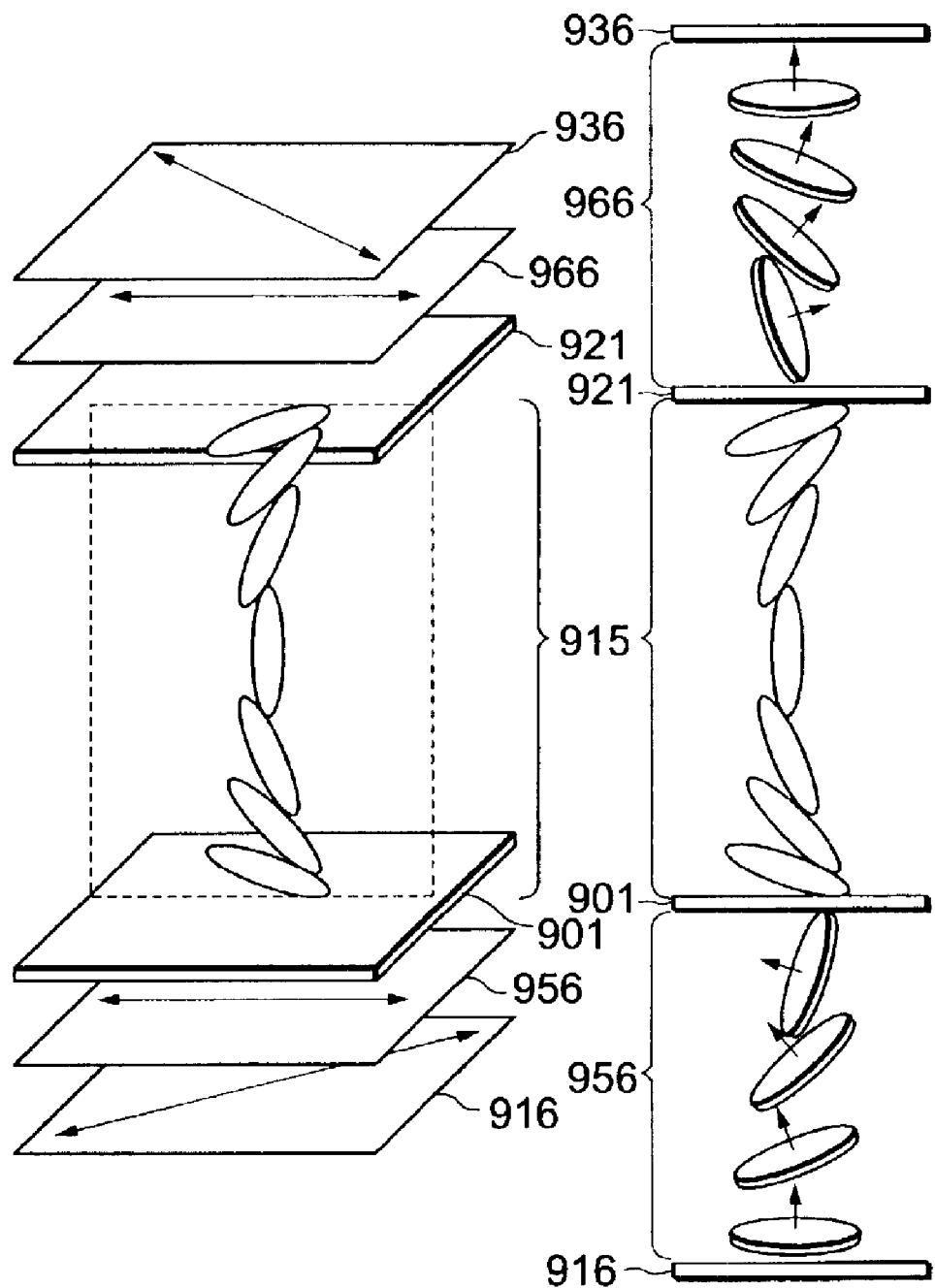
FIG. 1 is a schematic view showing a configuration of a conventional OCB liquid crystal display device using two negative birefringence compensation plates for compensating birefringence of a liquid crystal layer in a bend alignment state.
Figure 2:
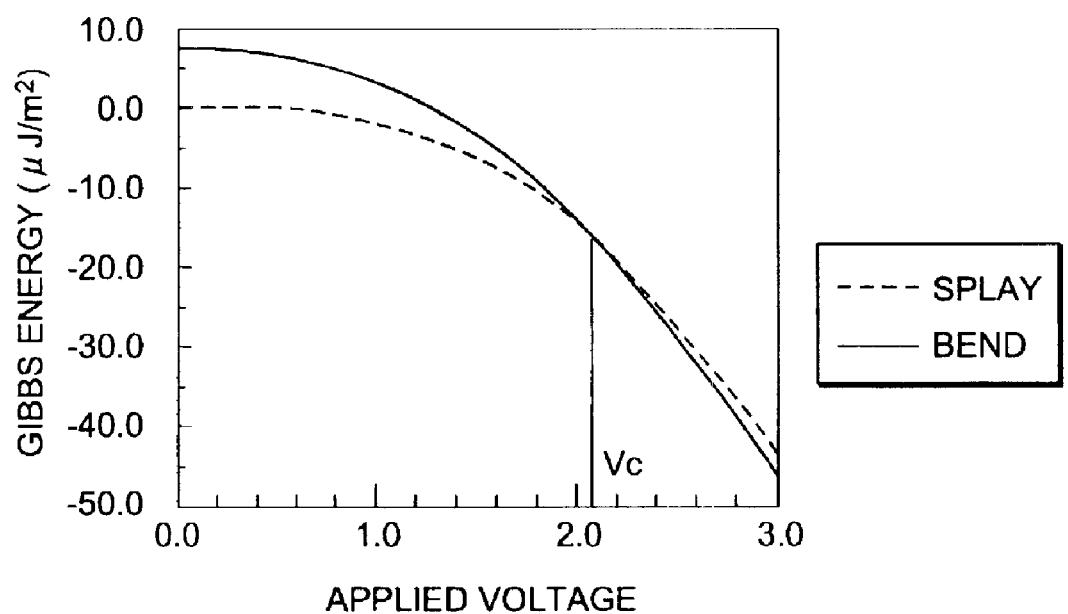
FIG. 2 is a graph showing the dependence of Gibbs free energy on an applied voltage obtained with respect to liquid crystal molecules in a splay alignment state and in a bend alignment state.
Figure 3:
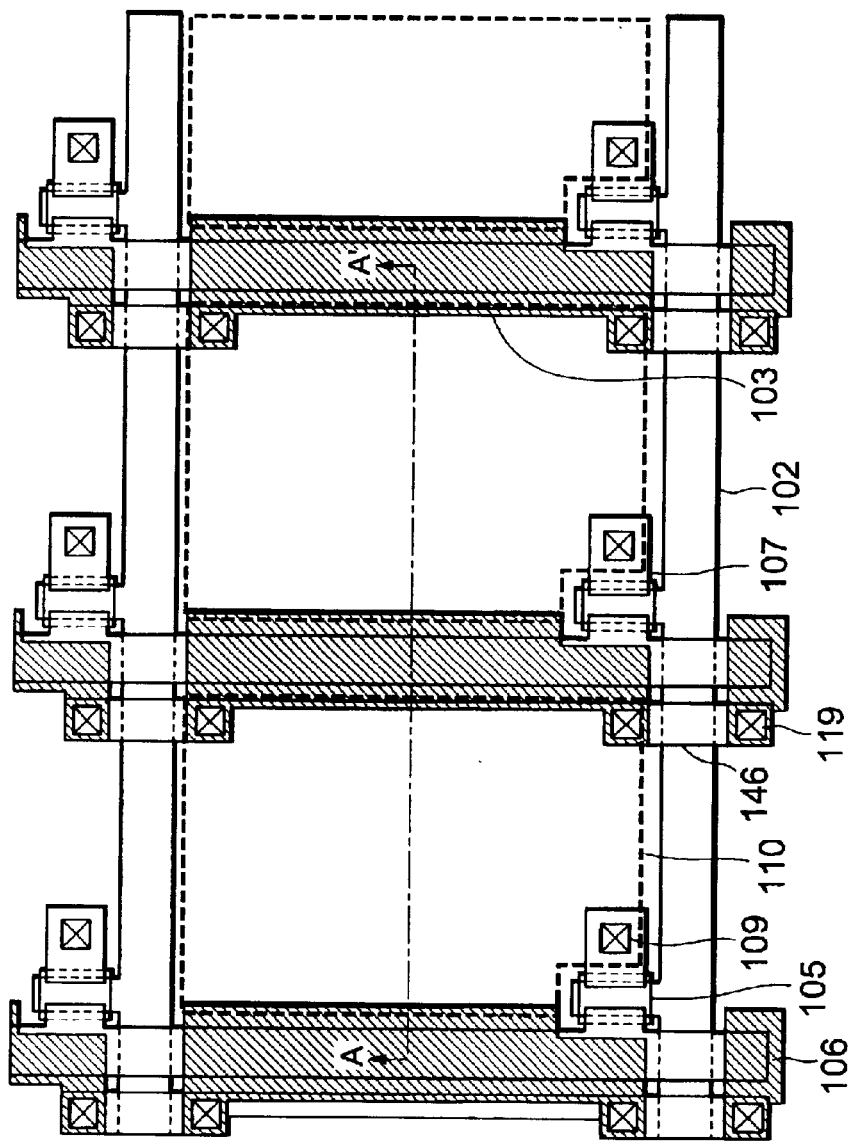
FIG. 3 is a plan view of a TFT substrate of a liquid crystal display device according to first and second embodiments of the present invention.
Figure 4:
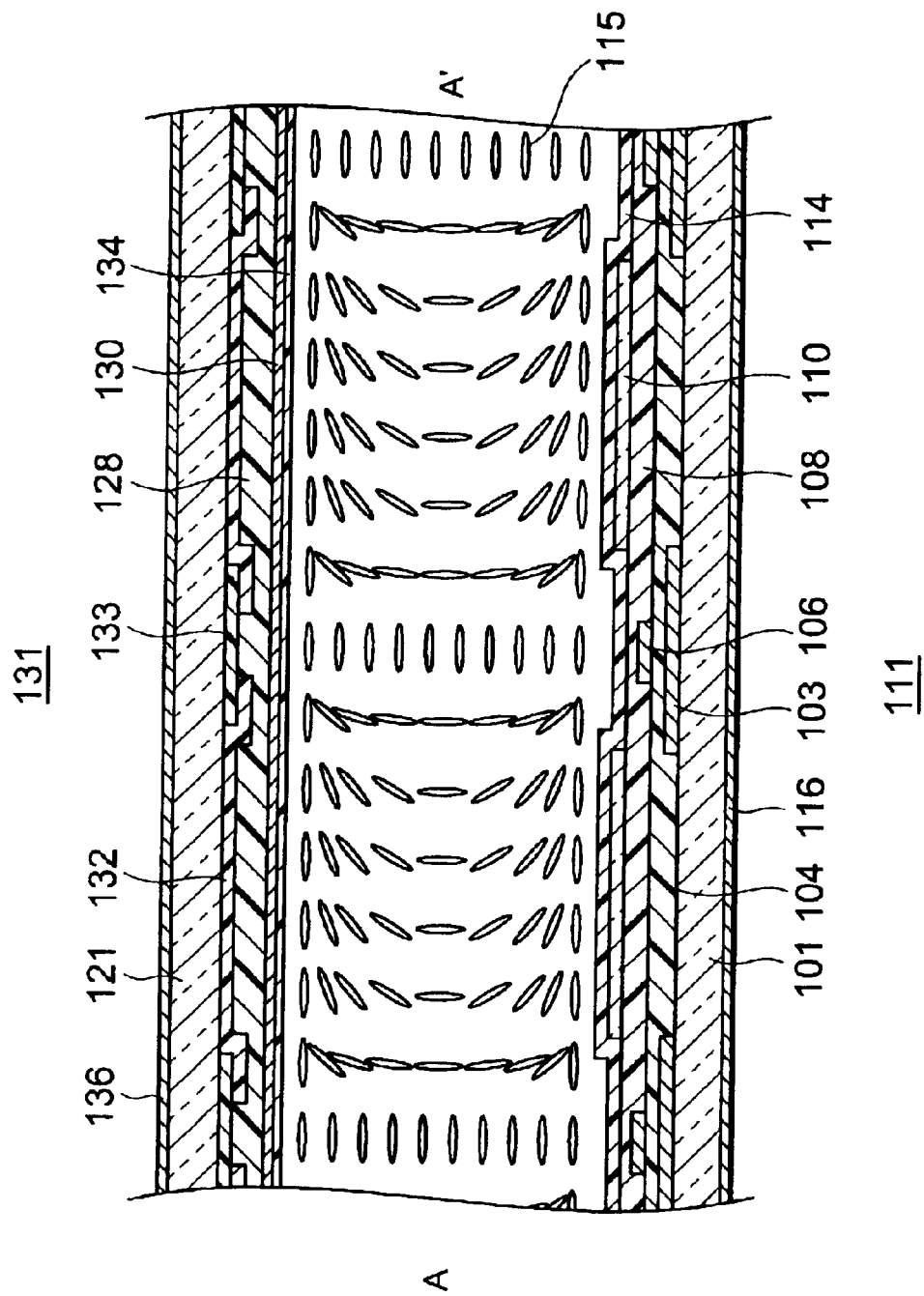
FIG. 4 is a cross sectional view of the liquid crystal display device according to the first embodiment of the present invention, taken along a cutting line A–A' shown in FIG. 3.

First, a liquid crystal display device according to a first embodiment of the present invention will be described using a plan view shown in FIG. 3 and a cross sectional view shown in FIG. 4. FIG. 3 is a plan view when a TFT substrate of the liquid crystal display device is viewed from a side of liquid crystal. FIG. 4 is a cross sectional view taken along a cutting line A–A' shown in FIG. 3. In the cross sectional view, since a relationship between upper and lower electrodes is primarily explained in the description of the embodiment, a contact hole, an alignment film, a color filter, a polarizer and the like are omitted.

In FIG. 4, a control signal electrode 103, a gate insulating film 104, a video signal electrode 106, a first interlayer insulating film 108 and a pixel electrode 110 are formed in order on a glass substrate 101 such as a transparent substrate made of glass or the like to form a TFT substrate 111. In the embodiment, the control signal electrode 103 is formed below the video signal electrode 106. All of the control signal electrodes 103 are formed as a physically continuous structure and a control signal is commonly supplied thereto through an external input. A glass substrate 121 is disposed to face the glass substrate 101 and a color filter 132, a black matrix 133, an insulating film 128 and a common electrode 130 are formed in order thereon to constitute a counter substrate 131. Alignment films 114 and 134 are formed as respective top layers of the TFT substrate 111 and the counter substrate 131, and then the TFT substrate 111 and the counter substrate 131 are disposed to face each other, and a liquid crystal 115 is filled therebetween.

When a power source is turned on in an initial state, a video signal having an amplitude equal to or larger than a critical voltage Vc is applied to the pixel electrode 110 and at the same time, a control signal having an amplitude larger than that of the video signal and a polarity opposite that of the video signal is applied to the control signal electrode 103. In this case, a region outside the pixel electrode 110 becomes nucleus generating means for making a transition from liquid crystal molecules in a certain alignment state to the molecules in a bend alignment state and the liquid crystal molecules change their initial splay alignment state into a bend alignment state, which phenomenon is observed to progress beginning with the peripheral region of the pixel electrode 110 to the inner region thereof, completing its operation in a short time.

The control signal electrodes 103 are indicated by cross hatching in FIG. 3 for easy understanding. In this embodiment, since the control signal electrode 103 is formed in the same layer as the scan signal electrode 102, a contact hole 119 is formed in the gate insulating film 104 to connect the adjacent control signal electrodes 103 together through a control signal connection electrode 146 formed in the same layer as the video signal electrode 106. Accordingly, the control signal electrode 103 is completely separated from the electrodes provided for displaying an image and a control signal is applied thereto. As a result, when the control signal is applied at appropriate timing to the control signal electrode 103 during operation for displaying an image and the voltage applied to the pixel electrode 110 is lowered to a voltage close to Vc, liquid crystal molecules in a bend alignment state can stably maintain their state. Furthermore, when the peripheral region of the control signal electrode 103 is made to geometrically and partially overlap the pixel electrode 110, light rays can be prevented from entering a display region. In addition, since a voltage from an external power source can be applied to the control signal electrode 103, when liquid crystal molecules change their splay alignment state as an initial alignment state into a bend alignment state, a sufficient high voltage can be applied to the liquid crystal molecules. Although the embodiment employs a structure as an example in which the control signal electrode 103 is formed in the same layer as the scan signal electrodes 102 and the control signal connection electrode 146 is formed in the same layer as the video signal electrode 106 such that a control signal line consisting of the control signal electrode 103 and the control signal connection electrode 146 can cross over the scan signal electrode 102 to connect the separated control signal electrodes 103 together, the control signal connection electrode 146 of the embodiment may not be disposed in the same layer as the video signal electrode 106 and, for example, an electrode disposed in the same layer as the pixel electrode may be used. In addition, although the embodiment employs a structure in which the control signal electrode 103 is divided into multiple electrodes and the control signal connection electrode 146 is newly formed so that the control signal line consisting of the control signal electrode 103 and the control signal connection electrode 146 can cross over the scan signal electrode 102 via the control signal connection electrode, instead, a structure in which the scan signal electrode 102 is divided into multiple electrodes and a scan signal connection electrode is newly formed so that a scan signal line consisting of the scan signal electrode 102 and the scan signal connection electrode can cross over the control signal electrode 103 may be employed in the embodiment.

It should be noted that in the case of a liquid crystal display device, in which pixels are divided into sub-pixels consisting of primary colors, a TFT substrate of the embodiment is drawn as a plan view shown in FIG. 3. That is, a pixel which is defined by the scan signal electrodes 102 and the video signal electrodes 106 is formed such that a ratio of a longitudinal length of pixel to a lateral length thereof is about 3:1 to constitute a vertically elongated rectangle. In this case, an electric field produced between the control signal electrode 103 and the common electrode 130 in this embodiment is influenced by an electric field between the video signal electrode 106 and the control signal electrode 103 and a lateral electric field from drain electrode 107 connected with the video signal electrode 106. Therefore, when the alignment direction of liquid crystal molecules at an interface between the liquid crystal 115 and the substrate is made to coincide with the short side of a pixel, the liquid crystal molecules are easily influenced by the electric field from the control signal electrode 103 and the initial transition from the splay alignment to the bend alignment of liquid crystal molecules easily occurs. In addition, the liquid crystal molecules in a bend alignment state after completion of the transition is advantageously stable. Note that in this case, the polarizing axes of polarizers 116 and 136 each are made to tilt at 45 degrees with respect to one of longitudinal and lateral lines. When the polarizers are used in a liquid crystal display device, since a most comfortable viewing angle is achieved along the axis of polarizer, a comfortable viewing angle is not obtained along horizontal and vertical directions.

On the other hand, when the alignment direction of liquid crystal molecules at an interface between the liquid crystal layer and the substrate is made to tilt at 45 degrees with respect to one of longitudinal and lateral lines, since the axes of the polarizers coincide with vertical and horizontal directions, a comfortable viewing angle is advantageously achieved along horizontal and vertical directions. On the contrary, generally, liquid crystal molecules in a bend alignment state are a little bit unstable. However, liquid crystal molecules in a bend alignment state in the embodiment, in which a control electrode is provided, the liquid crystal molecules in a bend alignment state become stable regardless of the alignment directions of liquid crystal molecules. Accordingly, the alignment direction of liquid crystal molecules at an interface between liquid crystal layer and substrates can be suitably made, for example, parallel to a short side of a pixel or being tilted at 45 degrees with respect to the short side, if necessary.

An alignment method is not limited to a widely used rubbing and may be realized by employing, for example, a light alignment technique. That is, a resin film having an optical alignment property is applied onto the top layers of the TFT substrate and the counter substrate and then linearly polarized ultraviolet light is irradiated to the resin film to make it an alignment film. In addition, the alignment film can be formed such that the liquid crystal molecules are aligned in a direction parallel to or perpendicular to the polarizing direction of the ultraviolet light at an interface between the alignment film and the liquid crystal layer by controlling the polarizing direction of the ultraviolet light irradiated to the resin film.

Furthermore, when a gap between the substrates is maintained by using a method in which gap materials are not sprayed within a pixel region, i. e., a method in which columns are formed in a periphery of the substrates, which is located outside the pixel region, the alignment of liquid crystal molecules becomes uniform within the pixel region, thereby achieving a further higher contrast.

Subsequently, a method of manufacturing the liquid crystal display device of the first embodiment will be described with reference to FIGS. 3 and 4.

An aluminum film is deposited on a glass substrate 101 by a sputtering method, and a scan signal electrode 102 and a control signal electrode 103 are formed by a photolithography technique. A gate insulating film 104 is formed on the scan signal electrode 102 and the control signal electrode 103, and then an amorphous silicon film is formed on the gate insulating film 104 by a chemical evaporation method and impurity ions are implanted thereinto. After that, a semiconductor island 105 made of amorphous silicon is formed by a photolithography technique to constitute an active layer of a thin film transistor corresponding to each pixel. A chromium film is deposited on the semiconductor island 105 by a sputtering method, and a video signal electrode (=source electrode) 106 and a drain electrode 107 are formed by a photolithography technique. A first interlayer insulating film 108 made from a silicon nitride film is formed on the video signal electrode 106 and the drain electrode 107 by a sputtering method, and then, a contact hole 109 for connecting the drain electrode with a pixel electrode is formed on each drain electrode 107 by a photolithography technique. An ITO film is deposited on the first interlayer insulating film 108 by a sputtering method, and the pixel electrodes 110 are formed in matrix by a photolithography technique to obtain a TFT substrate 111. In addition, a counter substrate 131 including a common electrode 130 made of an ITO film, a color filter 132, a black matrix 133 and an insulating film 128 is prepared.

An alignment film material is applied onto the upper and lower substrates and sintered at a temperature of 200° C. for 1 hour, and then, rubbing treatment is performed along the short side of the pixel electrode 110 to form alignment films 114 and 134. A heat curable sealant is applied to the peripheries of the substrates, and the upper and lower substrates are bonded to each other such that rubbing directions of the substrates are parallel to each other, and then, a sealant (not shown) is heated and cured. The nematic liquid crystal 115 having the birefringence $\Delta n$ of 0.13 is injected between the substrates through an injection inlet and the injection inlet is sealed with a light curable resin. The polarizers 116 and 136 are bonded respectively to the upper and lower substrates such that the polarizing axes are orthogonal to each other and made to tilt at 45 degrees relative to the direction in which an alignment film of a liquid crystal cell is rubbed.

In the liquid crystal panel thus obtained, when the power source is initially turned on, a video signal having an amplitude of 5 V is applied to the pixel electrode 110. Simultaneously, a control signal having an amplitude of 20 V and a polarity opposite that of the video signal is applied to the control signal electrode 103. To easily generate a nucleus for making a transition from a certain alignment state to a desired one at the time of initial turn-on of the power source, making the video signal and the control signal have a polarity opposite each other is effective. In addition, to securely complete the transition in all pixels, it is necessary to increase the amplitude of the control signal up to about 20 V. This operation securely completes an initial transition from liquid crystal molecules in a splay alignment state to the same in a bend alignment state within more than 10 seconds without applying a high voltage to the pixel electrode 110. In addition, continuously applying the voltage to the control signal electrode during operation for displaying an image makes the liquid crystal molecules stably stay in a bend alignment state.

Note that the amplitude of the control signal should preferably be reduced to about 10 V during operation for displaying an image. If the amplitude of the control signal is too large, a lateral electric field within the liquid crystal cell becomes large, requiring a width of light shielding wider. When the amplitude of the control signal is made to maintain 20 V, it is necessary to shield light over the width of 12 μm from the end of the pixel electrode 110.

Also, the width of light shielding is changed depending on polarities of the video signal and the control signal corresponding to the pixel electrode 110 and the control signal electrode 103, both electrodes being adjacent to each other. Assuming that the amplitude of the control signal is 10 V, the width of light shielding is 5 μm in the case of both electrodes having the same polarity. However, the width of 10 μm is required in the case of both electrodes having polarity opposite each other.

Also, in the case where the alignment film is rubbed at an angle tilted 45 degrees with respect to the lateral line of the liquid crystal cell, even when the video signal and the control signal corresponding to the pixel electrode 110 and the control signal electrode 103, both electrodes being adjacent to each other, are made to always have the same polarity, the width of light shielding is 10 μm. As compared with the case where rubbing is performed parallel to the short side of a pixel, an aperture ratio becomes worse, but liquid crystal molecules in a bend alignment state are stably able to maintain the state.

Figure 5:
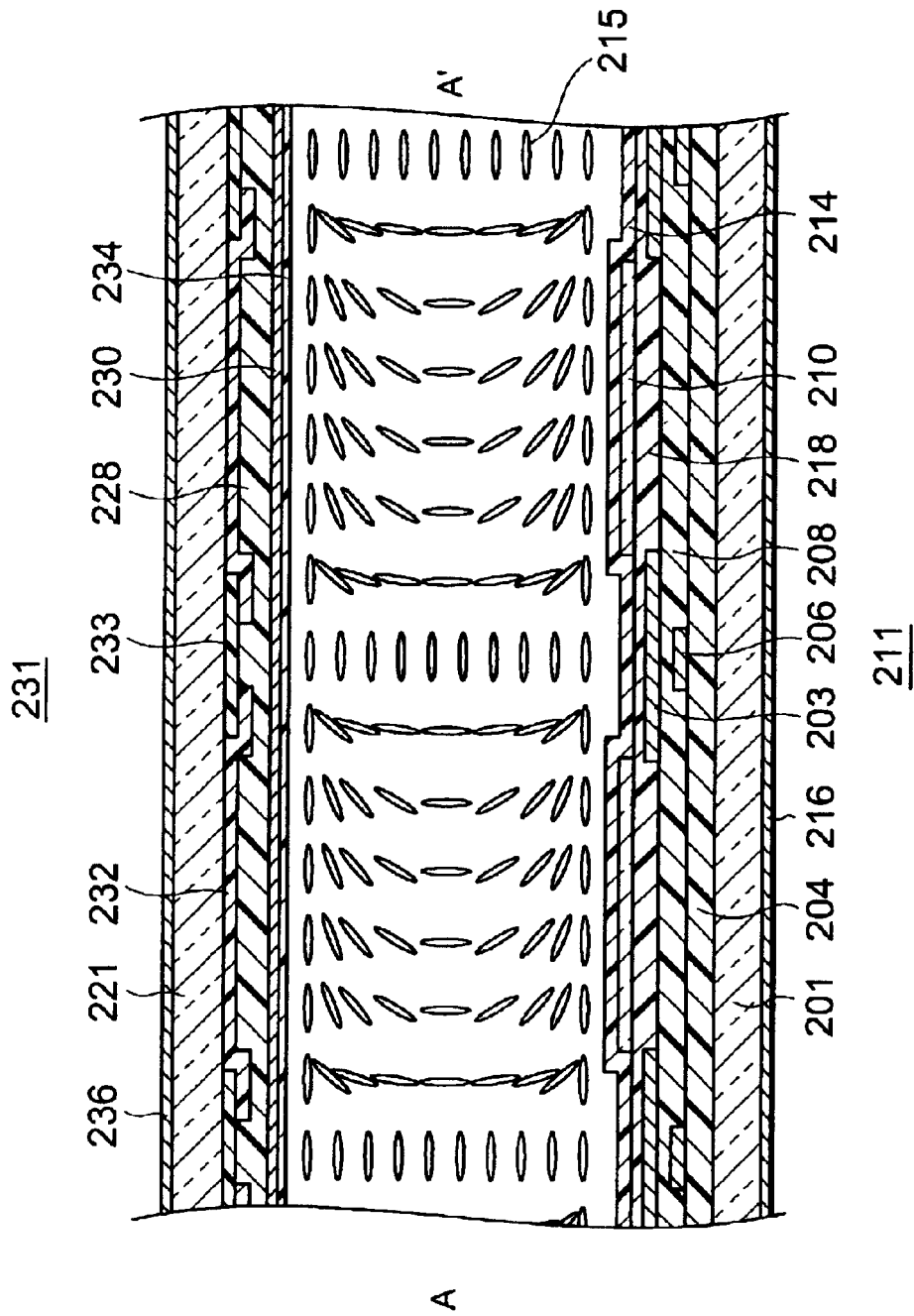
FIG. 5 is a cross sectional view of the liquid crystal display device according to the second embodiment of the present invention, taken along the cutting line A–A' shown in FIG. 3.

Subsequently, a liquid crystal display device according to a second embodiment of the present invention will be described using the plan view shown in FIG. 3 and a cross sectional view shown in FIG. 5. FIG. 3 is the plan view when the TFT substrate of the liquid crystal display device is viewed from the side of a liquid crystal and FIG. 5 is a cross sectional view taken along a cutting line A–A' shown in FIG. 3. In FIG. 5, the same elements as those in FIG. 4 are indicated by numerals obtained by adding 100 to the numerals in FIG. 4. The second embodiment is different from the first embodiment in that a control signal electrode 203 is formed as a layer higher than a video signal electrode 206 via a first interlayer insulating film 208 and in a layer lower than a pixel electrode 210 via a second interlayer insulating film 218. All control signal electrodes 203 are electrically connected together and a control signal is commonly applied thereto through an external input.

When the power source is initially turned on, a video signal having an amplitude equal to or larger than the critical voltage Vc is applied to the pixel electrode 210. Simultaneously, a control signal having an amplitude larger than that of the video signal and a polarity opposite that of the video signal is applied to the control signal electrode 203. In this case, the region outside the pixel electrode 210 becomes nucleus generating means for making a transition from an initial alignment state to a bend alignment state and the initial transition from a splay alignment state to a bend alignment state progresses beginning with the periphery of the pixel electrode 210, completing its operation in a short time.

The control signal electrode 203 can be completely separated from the electrodes provided for displaying an image and the control signal can be applied thereto. Therefore, applying as needed the control signal to the control signal electrode 203 during operation for displaying an image makes liquid crystal molecules stably stay in a bend alignment state even when the voltage applied to the pixel electrode 210 is lowered to a voltage close to Vc. Furthermore, making the periphery of the control signal electrode 203 partially overlap the pixel electrode 210 prevents light from entering within a display region.

Note that the alignment direction of liquid crystal molecules at an interface between the liquid crystal layer and the substrate can be suitably made, for example, parallel to a short side of a pixel or being tilted at 45 degrees with respect to the short side, if necessary, as is the case with first embodiment.

The alignment method and the gap formation method which are applied to this embodiment are the same as those employed in the first embodiment and also employed in embodiments described below.

Subsequently, a method of manufacturing the liquid crystal display device of the second embodiment will be described with reference to FIGS. 3 and 5.

An aluminum film is deposited on a glass substrate 201 by a sputtering method and a scan signal electrode 202 is formed by a photolithography technique. A gate insulating film 204 is formed on the scan signal electrode 202 and an amorphous silicon film is formed on the gate insulating film 204 by a chemical evaporation method, and then, impurity ions are implanted thereinto. After that, a semiconductor island 205 made of amorphous silicon is formed by a photolithography technique to constitute an active layer of a thin film transistor corresponding to each pixel. A chromium film is deposited on the semiconductor island 205 by a sputtering method, and a video signal electrode (=source electrode) 206 and a drain electrode 207 are formed by a photolithography technique. A first interlayer insulating film 208 made from a silicon oxide film is formed on the video signal electrode 206 and the drain electrode 207 by a sputtering method and an aluminum film is deposited on the first interlayer insulating film 208 by a sputtering method, and then, the control signal electrode 203 is formed by a photolithography technique. A second interlayer insulating film 218 made from a silicon oxide film is formed on the control signal electrode 203 by a sputtering method, and then a contact hole 209 for connecting the drain electrode with pixel electrode is formed on the drain electrode 207 by a photolithography technique. An ITO film is deposited on the second interlayer insulating film 218 by a sputtering method and pixel electrodes 210 are formed in matrix by a photolithography technique to obtain a TFT substrate 211. In addition, a counter substrate 231 including a common electrode 230 made of ITO, a color filter 232, a black matrix 233 and an insulating film 228 is prepared.

An alignment film material is applied onto the upper and lower substrates and sintered at a temperature of 200° C. for 1 hour, and rubbed in a direction parallel to the short side of the pixel electrode 210 to form alignment films 214 and 234. A heat curable sealant is applied to the peripheries of the substrates and the upper and lower substrates are bonded to each other such that rubbing directions thereof are parallel to each other, and a sealant (not shown) is heated and cured. The nematic liquid crystal 215 having the birefringence Δn of 0.13 is injected between the substrates through an injection inlet and the injection inlet is sealed with a light curable resin. The polarizers 216 and 236 are bonded respectively to the upper and lower substrates such that the polarizing axes of the polarizers are orthogonal to each other and are positioned to tilt at an angle of 45 degrees relative to the direction in which an alignment film of a liquid crystal cell is rubbed.

Figure 6:
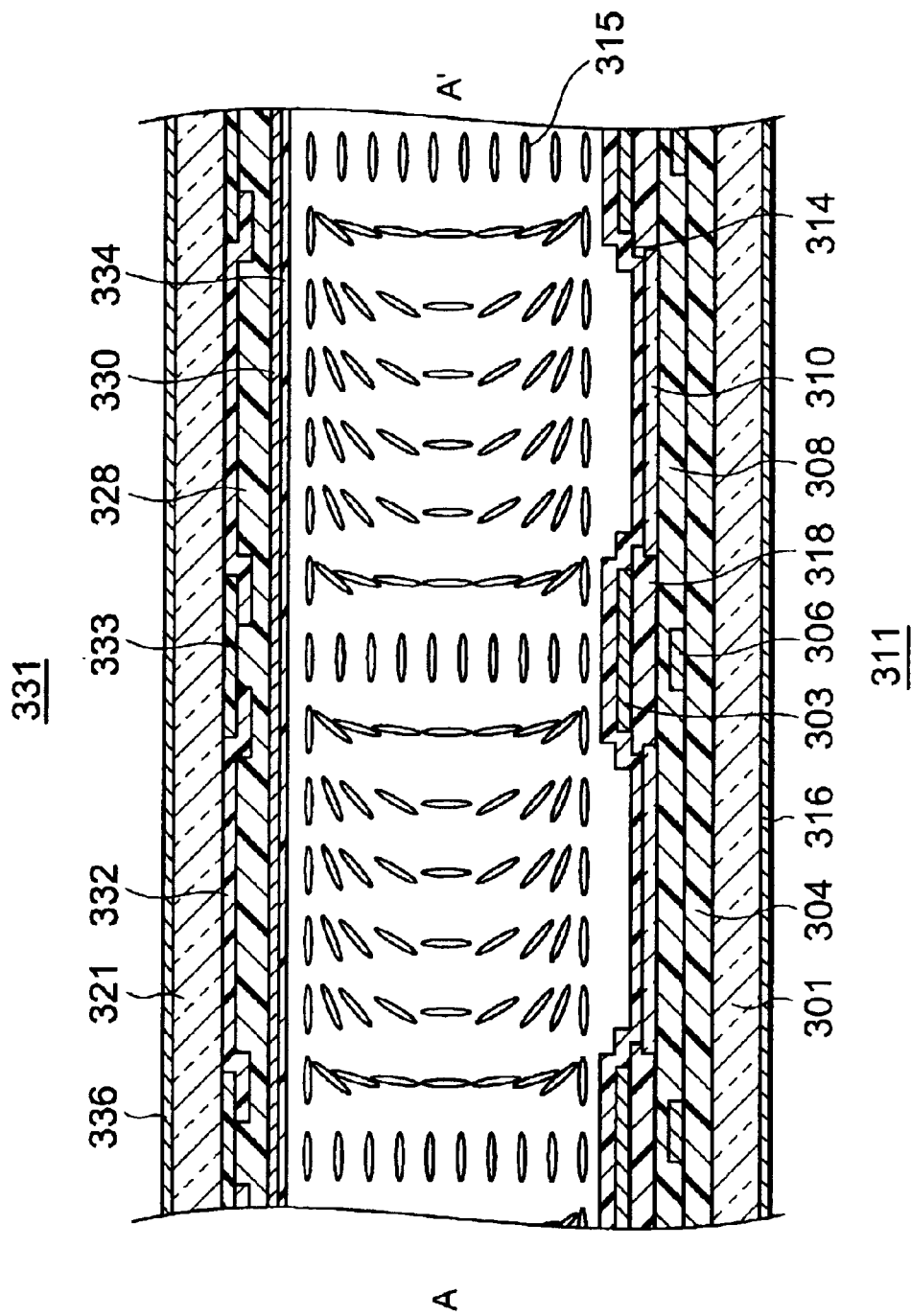
FIG. 6 is a cross sectional view of a liquid crystal display device according to a third embodiment of the present invention, taken along the cutting line A–A' shown in FIG. 3.

Subsequently, a liquid crystal display device according to a third embodiment of the present invention will be described using a cross sectional view shown in FIG. 6. The same elements as those in FIGS. 3 and 4 are indicated by numerals obtained by adding 200 to the numerals in FIGS. 3 and 4. The third embodiment is different from the first embodiment in that a control signal electrode 303 is formed as an layer higher than pixel electrode 310 by disposing a first interlayer insulating film 308 and a second interlayer insulating film 318 under the control signal electrode 303, and a portion of the second interlayer insulating film 318 located on the pixel electrodes 310 is removed. All control signal electrodes 303 are electrically connected together and a control signal is commonly applied thereto from an external input.

When a power source is initially turned on, a video signal having an amplitude equal to or larger than the critical voltage Vc is applied to the pixel electrode 310. Simultaneously, a control signal having an amplitude larger than that of the video signal and a polarity opposite that of the video signal is applied to the control signal electrode 303. In this case, the region outside the pixel electrode 310 becomes nucleus generating means for making a transition from an initial alignment state to a bend alignment state and an initial transition from a splay alignment state to a bend alignment state progresses beginning with the peripheral region of the pixel electrode 310, completing its operation in a short time.

The control signal can be applied to the control signal electrode 303 in a situation where the control signal electrode 303 is completely separated from the electrodes provided for displaying an image. Therefore, applying as needed the control signal to the control signal electrode 303 during operation for displaying an image makes liquid crystal molecules stably stay in a bend alignment state even when the voltage applied to the pixel electrode 310 is lowered to a voltage close to Vc. Furthermore, in the embodiment, since vertical relationship between the pixel electrode 310 and the control signal electrode 303 is inverted with respect to the vertical relationship observed in the first and second embodiments, the pixel electrode 310 and the control signal electrode 303 cannot be manufactured to overlap each other, apparently disabling prevention of occurrence of disclination. Therefore, when the pixel electrode 310 and the control signal electrode 303 are spaced a certain distance from each other in consideration of the influence of a lateral electric field, it becomes necessary to extend a black matrix in a lateral direction to partially overlap the pixel electrode 310 to block light passing through a line in which the disclination is generated.

Note that the alignment direction of liquid crystal molecules at an interface between the liquid crystal layer 315 and the substrate can be suitably made, for example, parallel to a short side of a pixel or being tilted at 45 degrees with respect to the short side, if necessary, as is the case with the first embodiment.

Subsequently, a method of manufacturing the liquid crystal display device of the third embodiment will be described with reference to FIGS. 3 and 6.

An aluminum film is deposited on a glass substrate 301 by a sputtering method and a scan signal electrode 302 is formed by a photolithography technique. A gate insulating film 304 is formed on the scan signal electrode 302 and an amorphous silicon film is formed on the gate insulating film 304 by a chemical evaporation method, and then, impurity ions are implanted thereinto. After that, a semiconductor island 305 made of amorphous silicon is formed by a photolithography technique to constitute an active layer of a thin film transistor corresponding to each pixel. A chromium film is deposited on the semiconductor island 305 by a sputtering method and a video signal electrode (=source electrode) 306 and a drain electrode 307 are formed by a photolithography technique. A first interlayer insulating film 308 made from a silicon oxide film is formed on the video signal electrode 306 and the drain electrode 307 by a sputtering method and a contact hole 309 for connecting the drain electrode with a pixel electrode is formed on the drain electrode 307 by a photolithography technique. An ITO film is deposited on the first interlayer insulating film 308 by a sputtering method and the pixel electrodes 310 are formed in matrix by a photolithography technique. A second interlayer insulating film 318 made from a silicon oxide film is formed on the pixel electrode 310 by a sputtering method and an aluminum film is deposited on the second interlayer insulating film 318 by a sputtering method, and then, a control signal electrode 303 is formed by a photolithography technique. Furthermore, a portion of the second interlayer insulating film 318 located on the respective pixel electrodes 310 is removed by a photolithography technique to obtain a TFT substrate 311. In addition, the counter substrate 331 including a common electrode 330 made of an ITO film, a color filter 332, a black matrix 333 and an insulating film 328 is prepared.

An alignment film material is applied onto the upper and lower substrates and sintered at a temperature of 200° C. for 1 hour and rubbed in a direction parallel to the short side of the pixel electrode 310 to form alignment films 314 and 334. A heat curable sealant is applied to the peripheries of the substrates and the upper and lower substrates are bonded to each other such that directions in which the alignment films are rubbed are parallel to each other, and a sealant is heated and cured. The nematic liquid crystal 315 having the birefringence $\Delta n$ of 0.13 is injected between the substrates through an injection inlet and the injection inlet is sealed with a light curable resin. The polarizers 316 and 336 are bonded to the upper and lower substrates such that the polarizing axes thereof are orthogonal to each other and are made to tilt at 45 degrees relative to the direction in which an alignment film of a liquid crystal cell is rubbed.

In the third embodiment, it is necessary to separate the pixel electrode 310 and the control signal electrode 303 from each other at an appropriate interval and further, cover the interval with a black matrix 333 formed in the counter substrate 331. As is the case with the first and second embodiments, it is preferable to lower the amplitude of the control signal to about 10 V during operation for displaying an image. However, the third embodiment is different from those embodiments in the following point. That is, if the amplitude of the control signal is too large, the influence of a lateral electric field from the control signal electrode increases and therefore, a width of light shielding to be covered by the black matrix 333 becomes larger. When an interval between the pixel electrode 310 and the control signal electrode 303 is made to be 2 $\mu$m and the amplitude of the control signal is made maintaining 20 V, it is necessary to shield the width of 10 $\mu$m from the end of the pixel electrode 310 not to allow light to transmit therethough.

Figure 7:
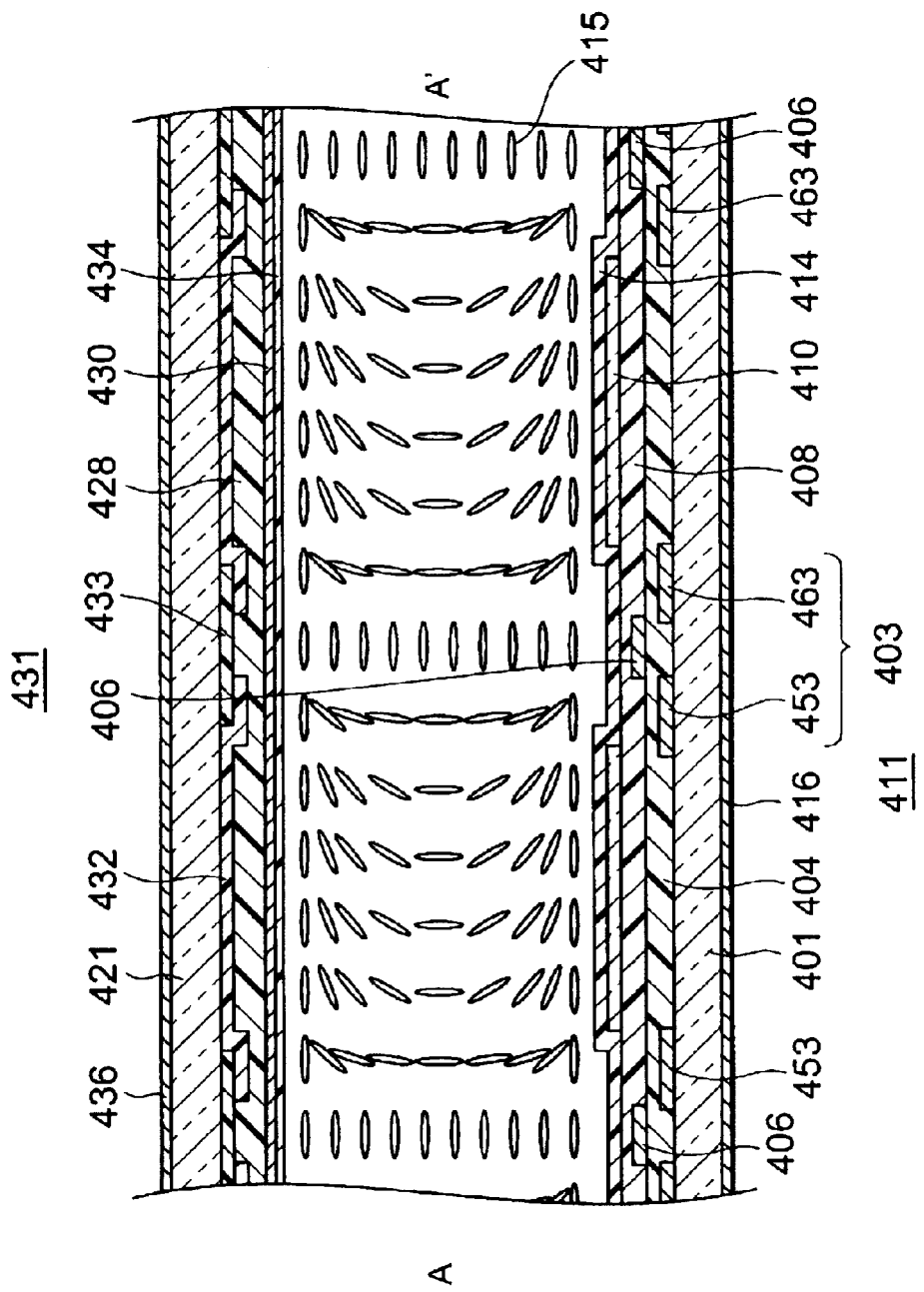
FIG. 7 is a cross sectional view of a liquid crystal display device according to a fourth embodiment of the present invention.

Subsequently, a liquid crystal display device according to a fourth embodiment of the present invention will be described using a cross sectional view shown in FIG. 7. The same elements as those in FIG. 4 are indicated by numerals obtained by adding 300 to the numerals used in FIG. 4. The fourth embodiment is similar to the first embodiment in that a control signal electrode 403 (consisting of control signal electrodes 453, 463) is formed as a layer lower than a video signal electrode 406 via a gate insulating film 404. However, the fourth embodiment is different from the first embodiment in that a control signal electrode is divided into two electrodes 453 and 463 so as to geometrically sandwich the video signal electrode 406. In addition, the right and left control signal electrodes 453 are disposed so as to correspond to one pixel electrode 410 sandwiched therebetween and the right and left control signal electrodes 463 are disposed so as to correspond to another pixel electrode 410 sandwiched therebetween. Even in this case, since the control signal electrodes 453 and 463 are formed in the same layer as a scan signal electrode as is the case with the first embodiment, the control signal line consisting of the control signal electrode 453 (or 463) and a control signal connection electrode crosses over the scan signal electrode via a control signal connection electrode (not shown) so that adjacent control signal electrodes of adjacent pixels are connected to each other.

Therefore, each of the pixel electrodes 410 is sandwiched by a set of right and left control signal electrodes. The fourth embodiment is different from the first embodiment in the following points. That is, even when an image is displayed by alternately applying voltages with different polarities to a pixel at time domain and alternately applying voltages with different polarities to adjacent pixels at geometric domain, which driving method is called inversion drive, since a set of the control signal electrodes 453 and one pixel electrode 410 sandwiched therebetween and a set of the control signal electrodes 463 and another pixel electrode 410 sandwiched therebetween are located adjacent to each other, the control signal electrodes 453 and 463 can be biased such that the polarities of the video signal and the control signal can be made to always coincide with each other with respect to the common electrode 430. The control signal electrode 403 has two inputs and adjacent control signal electrodes exhibit polarities opposite each other at the time of inversion drive.

When the power source is initially turned on, the video signal having an amplitude equal to or larger than the critical voltage Vc is applied to the pixel electrode 410. Simultaneously, the control signal having an amplitude larger than that of the video signal and a polarity opposite that of the video signal is applied to the control signal electrodes 453 and 463. In this case, the region outside the pixel electrode 410 becomes nucleus generating means for making a transition from an alignment state to a bend alignment state and the initial transition from a splay alignment state to a bend alignment state progresses beginning with the periphery of the pixel electrode 410, completing its operation in a short time.

The control signal can be applied to the control signal electrodes 453 and 463 in a situation where those electrodes are completely separated from the electrodes provided for displaying an image and. Therefore, applying as needed the control signal to the control signal electrodes 453, 463 during operation for displaying an image makes liquid crystal molecules stably stay in a bend alignment state even when the voltage applied to the pixel electrode 410 is lowered to a voltage close to Vc. Furthermore, making the peripheries of the control signal electrodes 453, 463 partially overlap the corresponding pixel electrodes 410 prevents light from entering within a display region.

Also, during operation for displaying an image, a voltage polarity the control signal electrode 453 (or 463) has with respect to the common electrode 430 and a voltage polarity the pixel electrode 410 sandwiched between the two control signal electrodes 453 (or 463) has with respect to the common electrode 430 can always be made to coincide with each other. Accordingly, lateral electric fields generated between the control signal electrode 453 and one pixel electrode 410 sandwiched between the control signal electrodes 453 and between the control signal electrode 463 and another pixel electrode 410 sandwiched between the control signal electrodes 463 become weaker than that observed in the first embodiment, reducing the influence of lateral electric field on liquid crystal molecules. Therefore, disclination greatly entering within the pixel electrode, never occurs and a width needed to make the pixel electrode 410 partially overlap the control signal electrode 453 or 463 for shielding incident light can advantageously be narrowed while increasing an aperture ratio to a larger extent than that observed in the first embodiment.

Note that the alignment direction of liquid crystal molecules at an interface between liquid crystal layer and substrates can be suitably made, for example, parallel to a short side of a pixel or to tilt at 45 degrees with respect to the short side, if necessary, as is the case with the first embodiment.

A method of manufacturing the liquid crystal display device of the fourth embodiment is the same as that employed in the first embodiment, and therefore the description will be omitted here. However, a control signal electrode of the fourth embodiment is configured different from that employed in the first embodiment and characterized as follows.

That is, in the first embodiment, when the video signal applied to the pixel electrode 110 and the control signal applied to the control signal electrode 103, both electrodes being adjacent to each other, have the same polarity, and further, the amplitude of the control signal is 10 V, the width needed to shield incident light is 5 $\mu$m. However, when those signals applied to the corresponding electrodes have the opposite polarity, the width needed is 10 $\mu$m. Accordingly, to further increase an aperture ratio, preferably, the control signal electrode 403 is divided into two electrodes to allow for two inputs operation so that the control signal applied to the control signal electrode 403 and the video signal applied to the pixel electrode 410 sandwiched between the two electrodes are made to always have the same polarity during operation for displaying an image, which configuration is employed in this embodiment.

Figure 8:
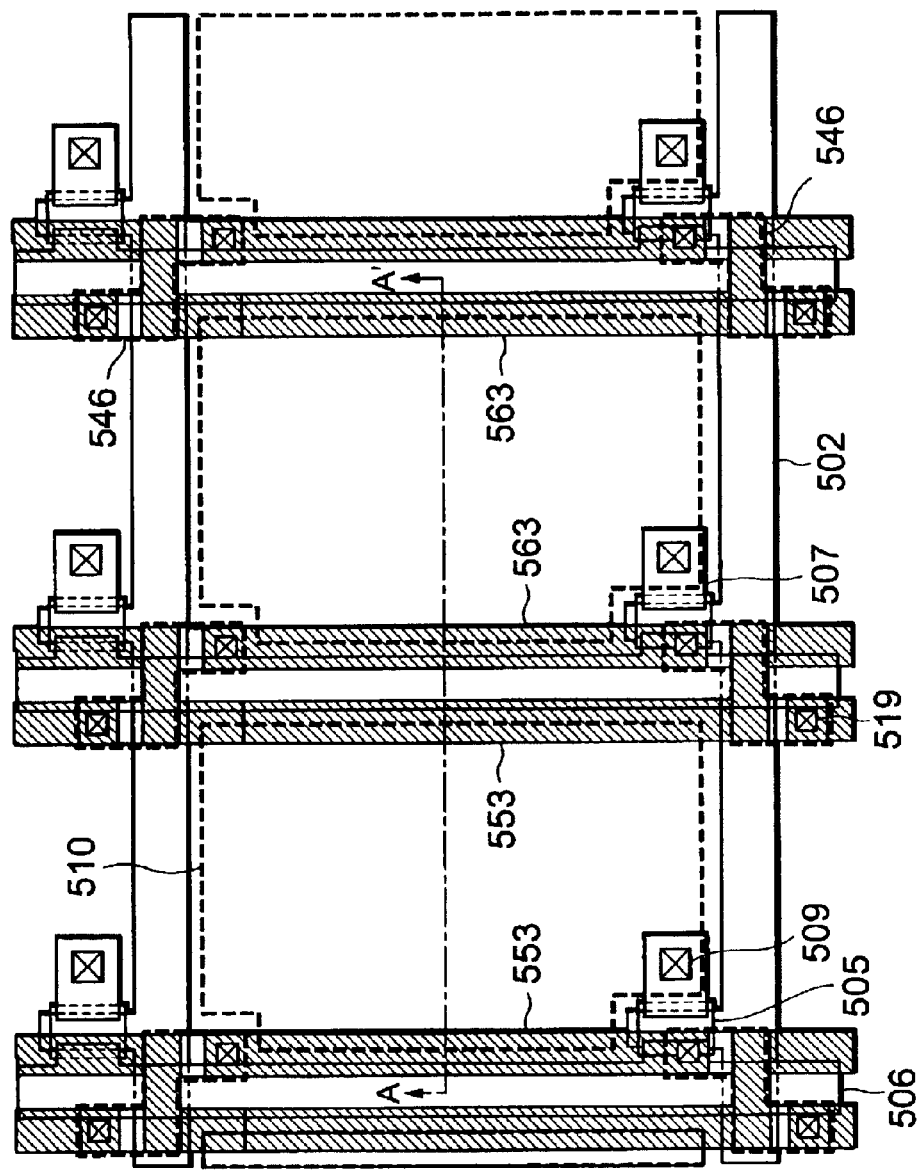
FIG. 8 is a plan view of a TFT substrate in a liquid crystal display device according to a fifth embodiment of the present invention.
Figure 9:
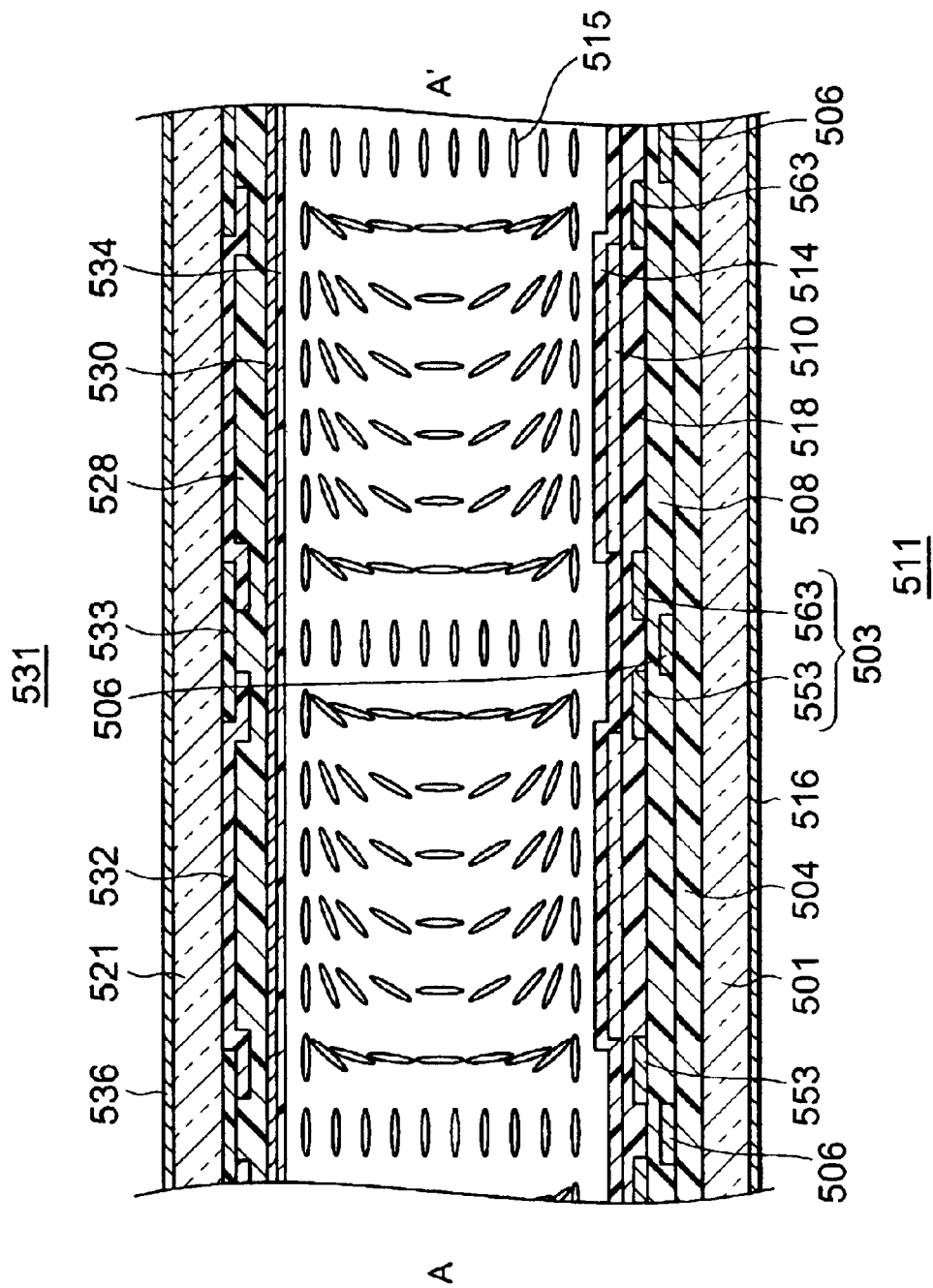
FIG. 9 is a cross sectional view of the liquid crystal display device according to the fifth embodiment of the present invention, taken along a cutting line A–A' shown in FIG. 8.

Subsequently, a liquid crystal display device according to a fifth embodiment of the present invention will be described using a plan view shown in FIG. 8 and a cross sectional view shown in FIG. 9. FIG. 8 is a plan view when a TFT substrate of the liquid crystal display device is viewed from the side of a liquid crystal. FIG. 9 is a cross sectional view obtained along a cutting line A–A' shown in FIG. 8. The same elements as those in FIG. 7 are indicated by numerals obtained by adding 100 to the numerals used in FIG. 7. The fifth embodiment is similar to the second embodiment in that a control signal electrode 503 is formed as a layer higher than a video signal electrode 506 via a first interlayer insulating film 508 and formed as a layer lower than a pixel electrode 510 via a second interlayer insulating film 518. However, the fifth embodiment is different from the second embodiment in that the control signal electrode 503 is divided into two electrodes 553, 563 so as to sandwich the video signal electrode 506 therebetween.

The control signal electrode 503 constructed as describe above interposes each pixel electrode 510 by a set of right and left control signal electrodes 553, 563. Even when an image is displayed by alternately applying voltages with different polarities to a pixel at time domain and alternately applying voltages with different polarities to adjacent pixels at geometric domain, which driving method is called inversion drive, since a set of the control signal electrodes 553 and one pixel electrode 510 sandwiched therebetween and a set of the control signal electrodes 563 and another pixel electrode 510 sandwiched therebetween are located adjacent to each other, the control signal electrodes 553 and 563 can be biased such that the polarities of the video signal and the control signal can be made to always coincide with each other with respect to the common electrode 530. In order to independently control the respective control signal electrodes 553 and 563, the control signal electrodes 553 and 563 are separated from each other and adjacent control signal electrodes 563 can be connected to each other via a control signal connection electrode 546 formed simultaneously with the pixel electrode 510 through a contact hole 519 formed in the second interlayer insulating film 518. Accordingly, the control signal electrode 503 is composed of two inputs, i. e., the control signal electrodes 553, 563, which have a polarity opposite each other at the time of inversion drive.

When the power source is initially turned on, the video signal having an amplitude equal to or larger than the critical voltage Vc is applied to the pixel electrode 510. Simultaneously, the control signal having an amplitude larger than that of the video signal and a polarity opposite that of the video signal is applied to the control signal electrodes 553 and 563. In this case, the region outside the pixel electrode 510 becomes nucleus generating means for making a transition from an alignment state to a bend alignment state and the initial transition from a splay alignment state to a bend alignment state progresses beginning with the periphery of the pixel electrode 510, completing its operation in a short time.

The control signal can be applied to the control signal electrodes 553 and 563 in a situation where those electrodes are completely separated from the electrodes provided for displaying an image. Therefore, applying as needed the control signal to the control signal electrodes 553, 563 during operation for displaying an image makes liquid crystal molecules stably stay in a bend alignment state even when the voltage applied to the pixel electrode 510 is lowered to a voltage close to Vc. Furthermore, making the peripheries of the control signal electrodes 553, 563 partially overlap the corresponding pixel electrodes 510 prevents light from entering within a display region.

Also, during operation for displaying an image, a voltage polarity the control signal electrode 553 (or 563) has with respect to the common electrode 530 and a voltage polarity the pixel electrode 510 sandwiched between the two control signal electrodes 553 (or 563) has with respect to the common electrode 530 can always be made to coincide with each other. Accordingly, lateral electric fields generated between the control signal electrode 553 and one pixel electrode 510 sandwiched between the control signal electrodes 553 and between the control signal electrode 563 and another pixel electrode 510 sandwiched between the control signal electrodes 563 become weaker as is the case with the fourth embodiment. Therefore, a width needed to make the pixel electrode 510 partially overlap the control signal electrode 553 or 563 for shielding incident light can advantageously be narrowed while increasing an aperture ratio to a larger extent than that observed in the second embodiment.

Note that the alignment direction of liquid crystal molecules at an interface between liquid crystal layer and substrates can be suitably made, for example, parallel to a short side of a pixel or to tilt at 45 degrees with respect to the short side, if necessary, as is the case with the first embodiment.

A method of manufacturing the liquid crystal display device of the fifth embodiment is the same as that employed in the second embodiment, and therefore the description will be omitted here. However, a control signal electrode of the fifth embodiment is configured different from that employed in the second embodiment and characterized as follows.

That is, in the second embodiment, when the video signal applied to the pixel electrode 110 and the control signal applied to the control signal electrode 103, both electrodes being adjacent to each other, have the same polarity, and further, the amplitude of the control signal is 10 V, the width needed to shield incident light is 5 $\mu$m. However, when those signals applied to the corresponding electrodes have the opposite polarity, the width needed is 10 $\mu$m. Accordingly, to further increase an aperture ratio, preferably, the control signal electrode 503 is divided into two electrodes to allow for two inputs operation so that the control signal applied to the control signal electrode 503 and the video signal applied to the pixel electrode 510 sandwiched between the two electrodes are made to always have the same polarity during operation for displaying an image, which configuration is employed in this embodiment.

Figure 10:
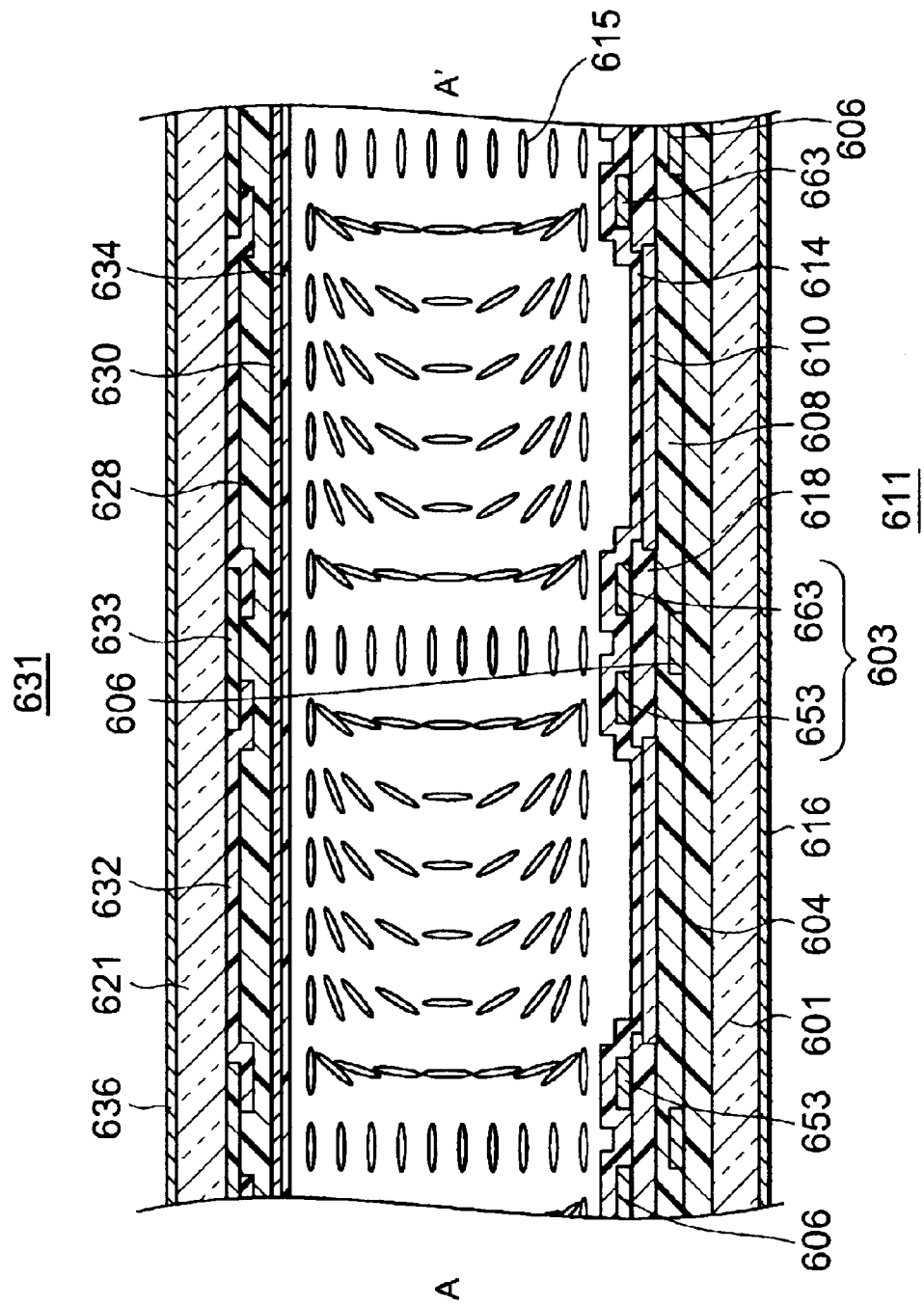
FIG. 10 is a cross sectional view of a liquid crystal display device according to a sixth embodiment of the present invention, taken along the cutting line A–A' shown in FIG. 8.

Subsequently, a liquid crystal display device according to a sixth embodiment of the present invention will be described using a cross sectional view shown in FIG. 10. The same elements as those in FIG. 7 are indicated by numerals obtained by adding 200 to the numerals used in FIG. 7. The sixth embodiment is similar to the third embodiment in that a control signal electrode 603 is formed as a layer higher than a video signal electrode 606 via a first interlayer insulating film 608 and a second interlayer insulating film 618, and formed as a layer higher than a pixel electrode 610 via the second interlayer insulating film 618, and further, a portion of the second interlayer insulating film 618 on the pixel electrode 610 is removed. However, the sixth embodiment is different from the third embodiment in that the control signal electrode 603 is divided into two electrodes 653, 663 so as to geometrically sandwich the video signal electrode 606 therebetween.

The control signal electrode 603 constructed as describe above interposes each pixel electrode 610 by a set of right and left control signal electrodes 653, 653 or 663, 663. Even when an image is displayed by alternately applying voltages with different polarities to a pixel at time domain and alternately applying voltages with different polarities to adjacent pixels at geometric domain, which driving method is called inversion drive, since a set of the control signal electrodes 653 and one pixel electrode 610 sandwiched therebetween and a set of the control signal electrodes 663 and another pixel electrode 610 sandwiched therebetween are located adjacent to each other, the control signal electrodes 653 and 663 can be biased such that the polarities of the video signal and the control signal can be made to always coincide with each other with respect to the common electrode 630. Accordingly, the control signal electrode 603 is composed of two inputs, i. e., the control signal electrodes 653, 663, which have a polarity opposite each other at the time of inversion drive.

When the power source is initially turned on, the video signal having an amplitude equal to or larger than the critical voltage Vc is applied to the pixel electrode 610. Simultaneously, the control signal having an amplitude larger than that of the video signal and a polarity opposite that of the video signal is applied to the control signal electrodes 653 and 663. In this case, the region outside the pixel electrode 610 becomes nucleus generating means for making a transition from a certain alignment state to a bend alignment state and the initial transition from a splay alignment state to a bend alignment state progresses beginning with the periphery of the pixel electrode 610, completing its operation in a short time.

The control signal can be applied to the control signal electrodes 653 and 663 in a situation where those electrodes are completely separated from the electrodes provided for displaying an image. Therefore, applying as needed the control signal to the control signal electrodes 653, 663 during operation for displaying an image makes liquid crystal molecules stably stay in a bend alignment state even when the voltage applied to the pixel electrode 610 is lowered to a voltage close to Vc.

Also, during operation for displaying an image, a voltage polarity the control signal electrode 653 (or 663) has with respect to the common electrode 630 and a voltage polarity the pixel electrode 610 sandwiched between the two control signal electrodes 653, 653 (or 663, 663) has with respect to the common electrode 630 can always be made to coincide with each other. Accordingly, lateral electric fields generated between the control signal electrode 653 and one pixel electrode 610 sandwiched between the control signal electrodes 653, 653 and between the control signal electrode 663 and another pixel electrode 610 sandwiched between the control signal electrodes 663, 663 become weaker. Therefore, a width needed to make the pixel electrode 610 partially overlap the control signal electrode 653 or 663 for shielding incident light using a black matrix can advantageously be narrowed while increasing an aperture ratio to a larger extent than that observed in the third embodiment.

Note that the alignment direction of liquid crystal molecules at an interface between liquid crystal layer and substrates can be suitably made, for example, parallel to a short side of a pixel or to tilt at 45 degrees with respect to the short side, if necessary, as is the case with the first embodiment.

A method of manufacturing the liquid crystal display device of the sixth embodiment is the same as that employed in the third embodiment, and therefore the description will be omitted here. However, a control signal electrode of the sixth embodiment is configured different from that employed in the third embodiment and characterized as follows.

That is, in the third embodiment, when the video signal applied to the pixel electrode 310 and the control signal applied to the control signal electrode 303, both electrodes being adjacent to each other, have the same polarity, and further, the amplitude of the control signal is 10 V, the width needed to shield incident light is 5 $\mu$m. However, when those signals applied to the corresponding electrodes have the opposite polarity, the width needed is 10 $\mu$m. Accordingly, to further increase an aperture ratio, preferably, the control signal electrode 603 is divided into two electrodes to allow for two inputs operation so that the control signal applied to the control signal electrode 603 and the video signal applied to the pixel electrode 610 sandwiched between the two electrodes are made to always have the same polarity during operation for displaying an image, which configuration is employed in this embodiment.

Figure 11:
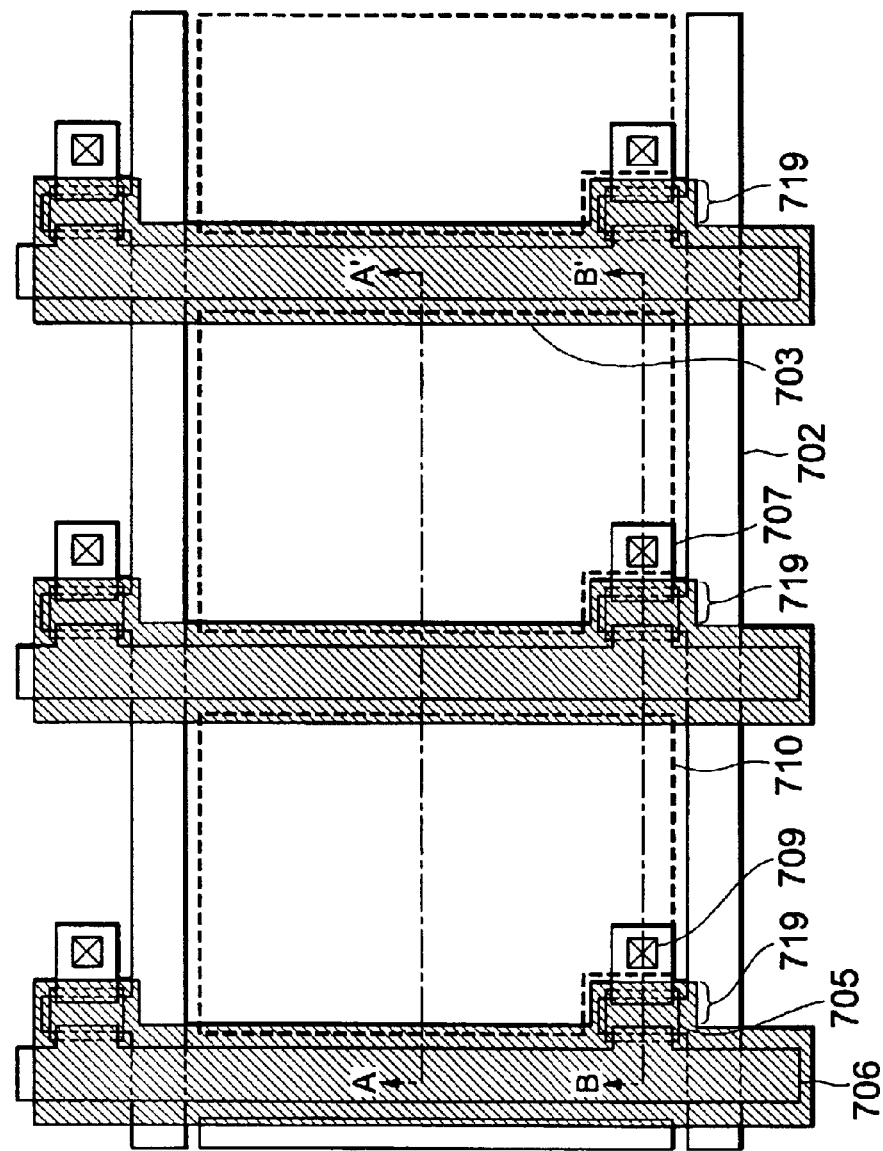
FIG. 11 is a plan view of a TFT substrate in a liquid crystal display device according to a seventh embodiment of the present invention.
Figure 12:
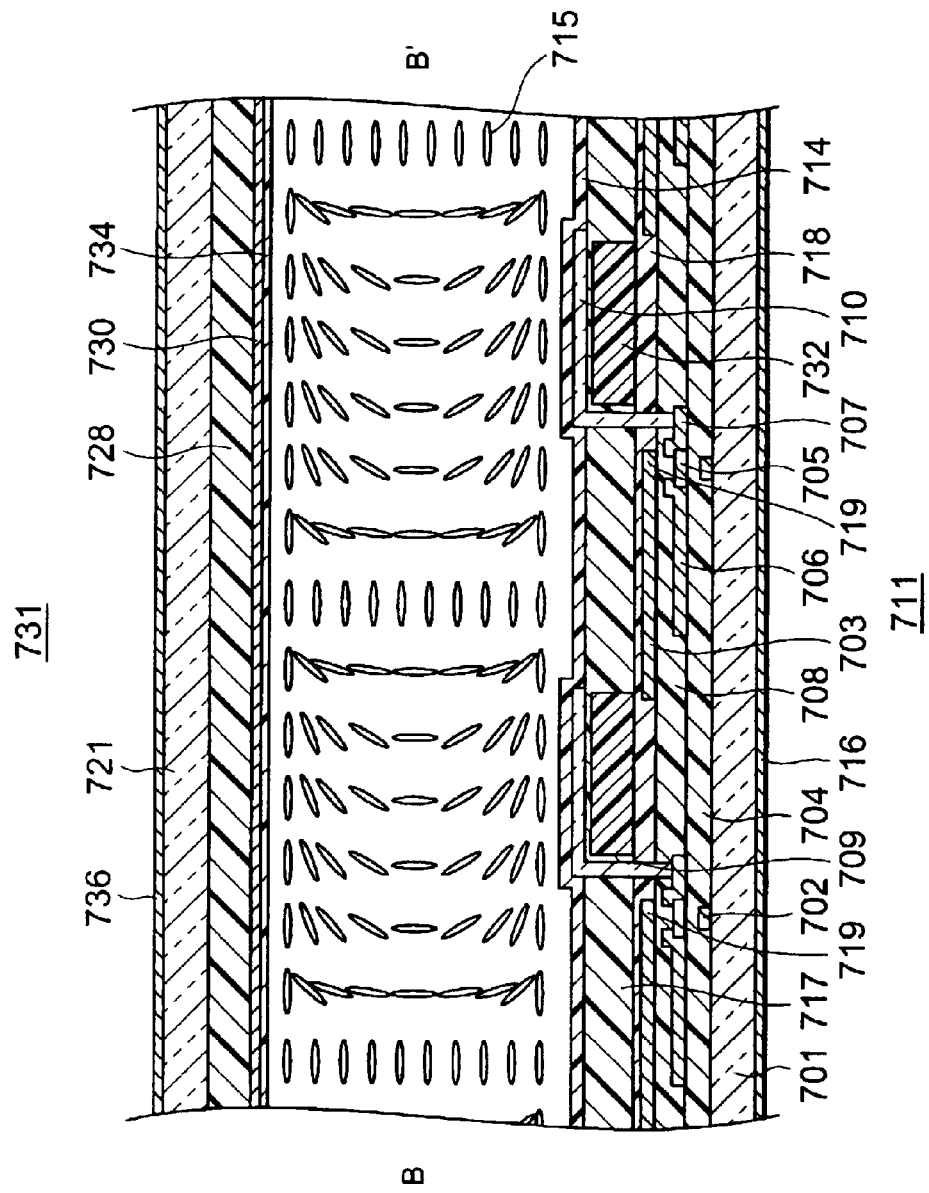
FIG. 12 is a cross sectional view of the liquid crystal display device according to the seventh embodiment of the present invention, taken along a cutting line B–B' shown in FIG. 11.

Subsequently, a liquid crystal display device according to a seventh embodiment of the present invention will be described using a plan view shown in FIG. 11 and a cross sectional view shown in FIG. 12. FIG. 11 is a plan view when a TFT substrate in the liquid crystal display device is viewed from the side of a liquid crystal. FIG. 12 is a cross sectional view obtained along a cutting line B-B' shown in FIG. 11. In the first to sixth embodiments, the pixel electrode, the control signal electrode and the video signal electrode are respectively formed in one of layers lower, interim and upper relative to others while contacting an insulating layer. However, in the seventh embodiment, a pixel electrode is not formed on an insulating layer but is formed on an overcoat layer formed on the insulating layer and further, a color filter layer is formed on the insulating layer and under the pixel electrode while being covered by the overcoat layer.

A scan signal electrode 702, a gate insulating film 704, a semiconductor island 705, a video signal electrode 706, a first interlayer insulating film 708, a control signal electrode 703, a second interlayer insulating film 718, a color filter layer 732, an overcoat layer 717, a contact hole 709, a pixel electrode 710 and an alignment film 714 are formed in order on a glass substrate 701 to constitute a TFT substrate 711.

An insulating film 728, a common electrode 730 and an alignment film 734 are formed in order on a glass substrate 721 to constitute a counter substrate 731. A liquid crystal layer 715 is filled between the TFT substrate 711 and the counter substrate 731.

The scan signal electrode 702, the video signal electrode 706 and the semiconductor island 705 are covered by the first interlayer insulating film 708, and the control signal electrode 703 including a light shielding film 719 (a part of the control signal electrode 703) is formed thereon. The control signal electrode 703 is covered by a second interlayer insulating film 718 and the color filter layer 732 is formed thereon. Furthermore, the color filter layer 732 is covered by the overcoat film 717 and the pixel electrode 710 is formed thereon. The pixel electrode 710 is connected with a drain electrode 707 through the contact hole 709. Thus, the pixel electrode 710 is separated from the scan signal electrode 702, the video signal electrode 706 and the semiconductor island 705, and in addition, an advantage arises in that a step for aligning the glass substrates 701 and 721 with each other does not need to be performed with high accuracy, producing allowance to manufacture a liquid crystal display device.

Although the configuration of the seventh embodiment may be applicable to any one of the first to sixth embodiments, in particular, when it is applied to the first, second, fourth, and fifth embodiments, advantages arise because the control signal electrode can also serves as a black matrix. In addition, although the embodiment is described using FIG. 11 as a plan view, the embodiment is not limited to this geometric configuration. That is, in a case where the control signal electrode is formed in the same layer as the scan signal electrode as is the case with the first embodiment, the wiring pattern shown in FIG. 3 may be employed. In addition, in a case where the single control signal electrode is divided into two electrodes and then the two electrodes are formed in the layer different from that in which the scan signal electrode is formed, which configuration is employed in the fifth embodiment, the wiring pattern shown in FIG. 8 may be employed.

Subsequently, a method of manufacturing a liquid crystal display device of the seventh embodiment will be described with reference to FIGS. 11 and 12.

An aluminum film is deposited on a glass substrate 701 by a sputtering method and a scan signal electrode 702 is formed by a photolithography technique. A gate insulating film 704 is formed on the scan signal electrode 702 and an amorphous silicon film is formed on the gate insulating film 704 by a chemical evaporation method, and then, impurity ions are implanted thereinto. After that, the semiconductor island 705 made of amorphous silicon is formed by a photolithography technique to form an active layer of a thin film transistor in each pixel. A chromium film is deposited on the semiconductor island 705 by a sputtering method, and a video signal electrode (=source electrode) 706 and a drain electrode 707 are formed by a photolithography technique. A first interlayer insulating film 708 made from a silicon oxide film is formed on the video signal electrode 706 and the drain electrode 707 by a sputtering method, and an aluminum film is deposited on the first interlayer insulating film 708 by a sputtering method, and then, a control signal electrode 703 indicated by cross hatching is formed by a photolithography technique. A second interlayer insulating film 718 made from a silicon oxide film is formed on the control signal electrode 703 by a sputtering method and a color filter layer 732 is formed on the second interlayer insulating film 718. The color filter layer 732 is covered by a overcoat film 717 and a contact hole 709 for connecting the drain electrode with the pixel electrode is formed on the corresponding drain electrode 707 by a photolithography technique. An ITO film is deposited on the overcoat film 717 by a sputtering method and a pixel electrode 710 is formed in matrix by a photolithography technique to obtain a TFT substrate 711. In addition, a counter substrate 731 including a common electrode 730 made of ITO is prepared.

An alignment film material is applied onto the upper and lower substrates and sintered at a temperature of 200° C. for 1 hour and rubbed in a direction parallel to the short side of the pixel electrode 710 to form alignment films 714 and 734. A heat curable sealant is applied to the peripheries of the substrates and the upper and lower substrates are bonded to each other such that the directions in which the alignment films of the substrates are rubbed are parallel to each other, and further, a sealant (not shown) is heated and cured. A nematic liquid crystal 715 having the birefringence Δn of 0.13 is injected between the substrates through an injection inlet and the injection inlet is sealed with a light curable resin. The polarizers 716 and 736 are bonded to the upper and lower substrates such that the polarizing axes thereof are orthogonal to each other and are made to tilt at 45 degrees relative to the rubbing direction of alignment films of a liquid crystal cell.

It should be appreciated that in the first to sixth embodiments, the pixel electrode, the control signal electrode and the video signal electrode are respectively formed in one of layers lower, interim and upper relative to others while contacting an insulating layer. However, in the seventh embodiment, a pixel electrode is not formed on an insulating layer but is formed on an overcoat layer formed on the insulating layer and therefore, the pixel electrode is formed as a layer further higher than other electrodes, allowing liquid crystal molecules in a bend alignment state to stably stay in the same state. In addition, an advantage arises in that a step for aligning the TFT substrate and the counter substrate with each other does not need to be performed with high accuracy, producing allowance to manufacture a liquid crystal display device.

As described above, according to the present invention, a dedicated control signal electrode is provided between pixel electrodes in addition to a scan signal electrode and a video signal electrode, and a strong electric field is generated between the control signal electrode and a common electrode. Accordingly, the initial transition from liquid crystal molecules in a splay alignment state to the same in a bend alignment state can quickly and securely be made and in addition, since a strong electric field is generated between the control signal electrode and the common electrode during operation for displaying an image, the liquid crystal molecules in a bend alignment state can stably maintain its alignment state even during operation for displaying an image. Furthermore, since the scan signal electrode, the video signal electrode and the common electrode, which are provided to display an image, are not used to make a transition from the liquid crystal molecules in a splay alignment state to the same in a bend alignment state, operation for displaying an image never is interrupted. In addition, since nucleus generating means such as a spacer does not need to be provided on the pixel electrode, a liquid crystal display device is free from leakage of incident light in a black display mode, achieving a high contrast and a high speed response.

What is claimed is:

1. A liquid crystal display device, comprising:
   a TFT substrate including a plurality of scan signal electrodes and a plurality of video signal electrodes, both electrodes crossing each other to partition a pixel area into a plurality of pixels, a thin film transistor formed in each of said plurality of pixels, a pixel electrode connected to said thin film transistor and a control signal electrode formed between said plurality of pixels so as to correspond to each of said plurality of pixels;
   a counter substrate including a common electrode for supplying a reference voltage to said plurality of pixels; and
   a liquid crystal layer sandwiched between said TFT substrate and said counter substrate and constructed such that liquid crystal molecules of said liquid crystal layer are aligned parallel to each other at interfaces between said liquid crystal molecules and both of said TFT substrate and said counter substrate;
   wherein when a first electric field is applied between said common electrode and said pixel electrode, a second electric field is applied between said control signal electrode and said common electrode, said second electric field being larger than said first electric field.

2. The liquid crystal display device according to claim 1, wherein said control signal electrode is disposed farther from said liquid crystal layer than said video signal electrode and said pixel electrode.

3. The liquid crystal display device according to claim 1, wherein said control signal electrode is disposed nearer said liquid crystal layer than said video signal electrode and disposed farther from said liquid crystal layer than said pixel electrode.

4. The liquid crystal display device according to claim 1, wherein said control signal electrode is disposed nearer said liquid crystal layer than said pixel electrode and said video signal electrode.

5. The liquid crystal display device according to claim 1, wherein said pixel electrode and said control signal electrode have an overlap region formed by making said pixel electrode and said control signal electrode overlap each other to shield light incident on said overlap region from a side of said TFT substrate opposite said counter substrate.

6. The liquid crystal display device according to claim 1, wherein said liquid crystal molecules at an interface between said TFT substrate and said liquid crystal layer are aligned in a wiring direction of said the scan signal electrode.

7. A liquid crystal display device, comprising:
   a TFT substrate including a plurality of scan signal electrodes and a plurality of video signal electrodes, both electrodes crossing each other to partition a pixel area into a plurality of pixels, a thin film transistor formed in each of said plurality of pixels, a pixel electrode connected to said thin film transistor and a control signal electrode formed between said plurality of pixels so as to correspond to each of said plurality of pixels;
   a counter substrate including a common electrode for supplying a reference voltage to said plurality of pixels; and
   a liquid crystal layer sandwiched between said TFT substrate and said counter substrate and constructed such that liquid crystal molecules of said liquid crystal layer are aligned parallel to each other at interfaces between said liquid crystal molecules and both of said TFT substrate and said counter substrate;
   wherein said liquid crystal molecules at an interface between said TFT substrate and said liquid crystal layer are aligned in a direction inclined at 45 degrees relative to each side of said pixel electrode and wherein when a first electric field is applied between said common electrode and said pixel electrode and a second electric field is applied between said control signal electrode and said common electrode.

8. The liquid crystal display device according to claim 1, wherein a color filter layer is formed nearer said liquid crystal layer than said scan signal electrode, said video signal electrode and said thin film transistor, and farther from said liquid crystal layer than said pixel electrode.

9. The liquid crystal display device according to claim 1 further comprising alignment films formed on respective uppermost surfaces of said TFT substrate and said counter substrate as uppermost layers, said uppermost surfaces facing each other, wherein said alignment films are formed such that resin films to be aligned by a light irradiation are applied on said uppermost surfaces of said TFT substrate and said counter substrate as uppermost layers, said uppermost surfaces facing each other, and then, said resin films are irradiated by linearly polarized ultraviolet light so that said liquid crystal molecules are aligned in one of directions parallel to and perpendicular to a polarized direction of said ultraviolet light at interfaces between said liquid crystal molecules and both of said alignment films by controlling said polarized direction of said ultraviolet light.

10. The liquid crystal display device according to claim 1, wherein a gap between said TFT substrate and said counter substrate is kept substantially constant by sandwiching a gap support member between said TFT substrate and said counter substrate, both substrates being disposed facing each other, in a region located outside said pixel area.

11. The liquid crystal display device according to claim 1, wherein in the event no electric field is applied between said pixel electrode and said common electrode, said liquid crystal molecules are in a splay alignment state, and in the event an electric field larger than an electric field needed to make said liquid crystal layer operate at an initial electric field application stage is applied between said pixel electrode and said common electrode to quickly make a transition from said liquid crystal molecules in a splay alignment state to the same in a bend alignment state.

12. A liquid crystal display device, comprising:
 a TFT substrate including a plurality of scan signal electrodes and a plurality of video signal electrodes, both electrodes crossing each other to partition a pixel area into a plurality of pixels, a thin film transistor formed in each of said plurality of pixels, a pixel electrode connected to said thin film transistor and a control signal electrode formed between said plurality of pixels so as to correspond to each of said plurality of pixels;
 a counter substrate including a common electrode for supplying a reference voltage to said plurality of pixels; and
 a liquid crystal layer sandwiched between said TFT substrate and said counter substrate and constructed such that liquid crystal molecules of said liquid crystal layer are aligned parallel to each other at interfaces between said liquid crystal molecules and both of said TFT substrate and said counter substrate;
 wherein during a first electric field being applied between said pixel electrode and said common electrode to make said liquid crystal layer operate, a second electric field larger than said first electric field for making said liquid crystal layer operate is continuously applied between said control signal electrode and said common electrode to make said liquid crystal molecules stay in a bend alignment state.

13. The liquid crystal display device according to claim 1, wherein at the time of a power source initially being turned-on to apply said first electric field between said pixel electrode and said common electrode, a predetermined voltage is applied to said pixel electrode and said control signal electrode, and a voltage having a polarity opposite that of said predetermined voltage is applied to a certain pixel electrode and a certain control signal electrode, both certain electrodes located adjacent to said pixel electrode and said control signal electrode.

14. The liquid crystal display device according to claim 1, wherein during said first electric field being applied between said pixel electrode and said common electrode to make said liquid crystal layer operate, a polarity a video signal has with respect to said common electrode and a polarity a control signal has with respect to said common electrode always coincide with each other.

* * * * *